US009106316B2

(12) United States Patent
Sorrells et al.

(10) Patent No.: US 9,106,316 B2
(45) Date of Patent: Aug. 11, 2015

(54) SYSTEMS AND METHODS OF RF POWER TRANSMISSION, MODULATION, AND AMPLIFICATION

(75) Inventors: David F. Sorrells, Middleburg, FL (US); Gregory S. Rawlins, Heathrow, FL (US)

(73) Assignee: ParkerVision, Inc., Jacksonville, FL (US)

( * ) Notice: Subject to any disclaimer, the term of this patent is extended or adjusted under 35 U.S.C. 154(b) by 303 days.

(21) Appl. No.: 12/473,026

(22) Filed: May 27, 2009

(65) Prior Publication Data
US 2009/0298433 A1    Dec. 3, 2009

Related U.S. Application Data

(60) Provisional application No. 61/056,347, filed on May 27, 2008, provisional application No. 61/129,027, filed on May 30, 2008.

(51) Int. Cl.
*H04B 1/00* (2006.01)
*H04B 1/525* (2015.01)

(52) U.S. Cl.
CPC ............... *H04B 1/525* (2013.01); *H04B 1/006* (2013.01)

(58) Field of Classification Search
CPC ....................................................... H04B 1/006
USPC ............................. 455/62, 63.1, 454; 375/259
See application file for complete search history.

(56) References Cited

U.S. PATENT DOCUMENTS

| 1,882,119 | A | 10/1932 | Chireix |
| 1,946,308 | A | 2/1934 | Chireix |
| 2,116,667 | A | 5/1938 | Chireix |
| 2,210,028 | A | 8/1940 | Doherty |
| 2,220,201 | A | 11/1940 | Bliss |
| 2,269,518 | A | 1/1942 | Chireix et al. |
| 2,282,706 | A | 5/1942 | Chireix et al. |
| 2,282,714 | A | 5/1942 | Fagot |
| 2,294,800 | A | 9/1942 | Price |
| 2,508,524 | A | 5/1950 | Lang |

(Continued)

FOREIGN PATENT DOCUMENTS

| EP | 0 011 464 A2 | 5/1980 |
| EP | 0 471 346 A1 | 8/1990 |

(Continued)

OTHER PUBLICATIONS

*Complaint*, filed Dec. 28, 2011, in the United States District Court, District of New Jersey, Maxtak Capital Advisors LLC et al. v. ParkerVision, Inc. et al., Case No. 2:11-cv-07549-CCC-JAD, 63 pages.

(Continued)

*Primary Examiner* — Hsin-chun Liao
(74) *Attorney, Agent, or Firm* — Sterne, Kessler, Goldstein & Fox PLLC

(57) ABSTRACT

Embodiments of the present invention reduce or eliminate the need for fixed frequency high Q band filtering for both full duplex (FDD) and half duplex (TDD) systems. Transceiver architectures according to embodiments of the present invention can be designed to have a single input/output for both FDD and TDD based standards. Further, according to embodiments, because the duplexer and/or SAW power losses are lowered or removed altogether, the system power output requirements can be met more easily and with higher efficiency.

18 Claims, 21 Drawing Sheets

(56) References Cited

U.S. PATENT DOCUMENTS

| | | |
|---|---|---|
| 2,529,073 A | 11/1950 | Chireix |
| 2,555,039 A | 5/1951 | Bissonette |
| 2,591,749 A | 4/1952 | Villemagne |
| 2,670,404 A | 2/1954 | Chireix |
| 2,677,806 A | 5/1954 | Chireix |
| 2,714,634 A | 8/1955 | Hall |
| 2,734,100 A | 2/1956 | Kendall |
| 2,857,591 A | 10/1958 | Nagel |
| 2,890,280 A | 6/1959 | Feyzeau |
| 2,908,753 A | 10/1959 | Emyei et al. |
| 2,938,945 A | 5/1960 | France |
| 2,963,933 A | 12/1960 | Bereskin |
| 2,964,622 A | 12/1960 | Fire |
| 2,968,697 A | 1/1961 | Rager, Jr. |
| 3,056,017 A | 9/1962 | Peras |
| 3,078,456 A | 2/1963 | Alpers |
| 3,121,198 A | 2/1964 | Potter |
| 3,154,782 A | 10/1964 | Kagawa et al. |
| 3,170,127 A | 2/1965 | Cramer |
| 3,176,060 A | 3/1965 | Bissonette et al. |
| 3,212,008 A | 10/1965 | Kahn |
| 3,219,862 A | 11/1965 | Kieffert |
| 3,263,019 A | 7/1966 | Hurvitz |
| 3,341,697 A | 9/1967 | Kaufman et al. |
| 3,413,570 A | 11/1968 | Bruene et al. |
| 3,418,595 A | 12/1968 | Loewenstern, Jr. |
| 3,436,686 A | 4/1969 | Vackar |
| 3,437,945 A | 4/1969 | Duncan |
| 3,458,816 A | 7/1969 | O'Brien |
| 3,493,718 A | 2/1970 | Kestner et al. |
| 3,513,352 A | 5/1970 | Souillard |
| 3,525,941 A | 8/1970 | Smith |
| 3,544,697 A | 12/1970 | Munch, Jr. |
| 3,651,429 A | 3/1972 | Ruthroff |
| 3,697,692 A | 10/1972 | Hafler |
| 3,716,730 A | 2/1973 | Cerny, Jr. |
| 3,777,275 A | 12/1973 | Cox |
| 3,789,314 A | 1/1974 | Beurrier |
| 3,815,040 A | 6/1974 | Seidel |
| 3,852,530 A | 12/1974 | Shen |
| 3,852,669 A | 12/1974 | Bowman et al. |
| 3,895,304 A * | 7/1975 | Klein .................... 327/556 |
| 3,896,395 A | 7/1975 | Cox |
| 3,906,390 A | 9/1975 | Rollett |
| 3,909,742 A | 9/1975 | Cox et al. |
| 3,927,379 A | 12/1975 | Cox et al. |
| 3,936,819 A | 2/1976 | Angelle et al. |
| 3,991,343 A | 11/1976 | Delpy |
| 4,090,147 A | 5/1978 | Seidel |
| 4,095,196 A | 6/1978 | Seidel |
| 4,104,946 A | 8/1978 | Peterson |
| 4,151,517 A | 4/1979 | Kelley |
| 4,178,557 A | 12/1979 | Henry |
| 4,229,715 A | 10/1980 | Henry |
| 4,301,490 A | 11/1981 | Nagel et al. |
| 4,346,354 A | 8/1982 | Hanna |
| 4,378,530 A | 3/1983 | Garde |
| 4,433,312 A | 2/1984 | Kahn |
| 4,439,744 A | 3/1984 | Kumar et al. |
| 4,441,080 A | 4/1984 | Saari |
| 4,446,440 A | 5/1984 | Bell |
| 4,485,357 A | 11/1984 | Voorman |
| 4,509,017 A | 4/1985 | Andren et al. |
| 4,511,813 A | 4/1985 | Pan |
| 4,580,111 A | 4/1986 | Swanson |
| 4,584,541 A | 4/1986 | Nossen |
| 4,605,902 A | 8/1986 | Harrington |
| 4,628,286 A | 12/1986 | Nossen |
| 4,682,119 A | 7/1987 | Michel |
| 4,682,149 A | 7/1987 | Larson |
| 4,686,448 A | 8/1987 | Jones et al. |
| 4,687,999 A | 8/1987 | Desperben et al. |
| 4,701,716 A | 10/1987 | Poole |
| 4,717,894 A | 1/1988 | Edwards et al. |
| 4,743,858 A | 5/1988 | Everard |
| 4,780,803 A | 10/1988 | Dede Garcia-Santamaria |
| 4,816,783 A | 3/1989 | Leitch |
| 4,817,116 A | 3/1989 | Akaiwa et al. |
| 4,873,492 A | 10/1989 | Myer |
| 4,951,303 A | 8/1990 | Larson |
| 4,974,236 A | 11/1990 | Gurcan et al. |
| 4,995,055 A | 2/1991 | Weinberger et al. |
| 5,005,419 A | 4/1991 | O'Donnell et al. |
| 5,012,200 A | 4/1991 | Meinzer |
| 5,017,888 A | 5/1991 | Meinzer |
| 5,077,539 A | 12/1991 | Howatt |
| 5,081,673 A | 1/1992 | Engelke et al. |
| 5,093,636 A | 3/1992 | Higgins, Jr. et al. |
| 5,115,203 A | 5/1992 | Krett et al. |
| 5,124,665 A | 6/1992 | McGann |
| 5,164,678 A | 11/1992 | Puri et al. |
| 5,214,670 A | 5/1993 | Ballatore |
| 5,229,735 A | 7/1993 | Quan |
| 5,239,275 A | 8/1993 | Leitch |
| 5,239,686 A | 8/1993 | Downey |
| 5,264,807 A | 11/1993 | Okubo et al. |
| 5,287,069 A | 2/1994 | Okubo et al. |
| 5,302,914 A | 4/1994 | Arntz et al. |
| 5,304,943 A | 4/1994 | Koontz |
| 5,307,069 A | 4/1994 | Evans |
| 5,345,189 A | 9/1994 | Hornak et al. |
| 5,351,288 A | 9/1994 | Engelke et al. |
| 5,365,187 A | 11/1994 | Hornak et al. |
| 5,365,190 A | 11/1994 | Yu et al. |
| 5,404,114 A | 4/1995 | Sager |
| 5,410,280 A | 4/1995 | Linguet et al. |
| 5,420,541 A | 5/1995 | Upton et al. |
| 5,426,641 A | 6/1995 | Afrashteh et al. |
| 5,432,473 A | 7/1995 | Mattila et al. |
| 5,438,591 A | 8/1995 | Oie et al. |
| 5,438,684 A | 8/1995 | Schwent et al. |
| 5,485,120 A | 1/1996 | Anvari |
| 5,490,172 A | 2/1996 | Komara |
| 5,495,500 A | 2/1996 | Jovanovich et al. |
| 5,508,657 A | 4/1996 | Behan |
| 5,515,068 A | 5/1996 | Uragami et al. |
| 5,530,722 A | 6/1996 | Dent |
| 5,541,554 A | 7/1996 | Stengel et al. |
| 5,554,865 A | 9/1996 | Larson |
| 5,559,471 A | 9/1996 | Black |
| 5,568,088 A | 10/1996 | Dent et al. |
| 5,574,967 A | 11/1996 | Dent et al. |
| 5,574,992 A | 11/1996 | Cygan et al. |
| 5,612,651 A | 3/1997 | Chethik |
| 5,621,351 A | 4/1997 | Puri et al. |
| 5,631,604 A | 5/1997 | Dent et al. |
| RE35,536 E | 6/1997 | Irissou et al. |
| 5,638,024 A | 6/1997 | Dent et al. |
| 5,678,208 A | 10/1997 | Kowalewski et al. |
| 5,694,433 A | 12/1997 | Dent |
| 5,697,074 A | 12/1997 | Makikallio et al. |
| 5,710,520 A | 1/1998 | Frey |
| 5,719,527 A | 2/1998 | Bateman et al. |
| 5,724,005 A | 3/1998 | Chen et al. |
| 5,732,334 A | 3/1998 | Miyake |
| 5,739,723 A | 4/1998 | Sigmon et al. |
| 5,757,229 A | 5/1998 | Mitzlaff |
| 5,764,704 A | 6/1998 | Shenoi |
| 5,767,750 A | 6/1998 | Yamaji |
| 5,770,971 A | 6/1998 | McNicol |
| 5,784,412 A | 7/1998 | Ichihara |
| 5,784,689 A | 7/1998 | Kobayashi |
| 5,786,727 A | 7/1998 | Sigmon |
| 5,792,956 A | 8/1998 | Li |
| 5,805,640 A | 9/1998 | O'Dea et al. |
| 5,815,531 A | 9/1998 | Dent |
| 5,835,128 A | 11/1998 | Macdonald et al. |
| 5,841,876 A | 11/1998 | Gifford et al. |
| 5,854,571 A | 12/1998 | Pinckley et al. |
| 5,862,460 A | 1/1999 | Rich |
| 5,872,481 A | 2/1999 | Sevic et al. |
| 5,877,643 A | 3/1999 | Drogi |
| 5,880,633 A | 3/1999 | Leizerovich et al. |
| 5,886,573 A | 3/1999 | Kolanek |

(56) References Cited

U.S. PATENT DOCUMENTS

| | | | |
|---|---|---|---|
| 5,886,575 A | 3/1999 | Long |
| 5,890,051 A | 3/1999 | Schlang et al. |
| 5,892,394 A | 4/1999 | Wu |
| 5,892,395 A | 4/1999 | Stengel et al. |
| 5,901,346 A | 5/1999 | Stengel et al. |
| 5,903,854 A | 5/1999 | Abe et al. |
| 5,933,766 A | 8/1999 | Dent |
| 5,949,283 A | 9/1999 | Proctor et al. |
| 5,952,947 A | 9/1999 | Nussbaum et al. |
| 5,956,097 A | 9/1999 | Nguyen et al. |
| 5,963,091 A | 10/1999 | Chen et al. |
| 5,973,559 A | 10/1999 | Alberty |
| 5,973,568 A | 10/1999 | Shapiro et al. |
| 5,974,041 A | 10/1999 | Kornfeld et al. |
| 5,990,734 A | 11/1999 | Wright et al. |
| 5,990,738 A | 11/1999 | Wright et al. |
| 5,999,046 A | 12/1999 | Kotzamanis |
| 6,011,830 A | 1/2000 | Sasin et al. |
| 6,026,286 A | 2/2000 | Long |
| 6,028,485 A | 2/2000 | Sigmon et al. |
| 6,043,707 A | 3/2000 | Budnik |
| 6,054,894 A | 4/2000 | Wright et al. |
| 6,054,896 A | 4/2000 | Wright et al. |
| 6,057,798 A | 5/2000 | Burrier et al. |
| 6,069,525 A | 5/2000 | Sevic et al. |
| 6,072,361 A | 6/2000 | Myers et al. |
| 6,085,074 A | 7/2000 | Cygan |
| 6,097,252 A | 8/2000 | Sigmon et al. |
| 6,104,991 A | 8/2000 | Newland et al. |
| 6,111,461 A | 8/2000 | Matsuno |
| 6,111,462 A | 8/2000 | Mucenieks et al. |
| 6,115,368 A * | 9/2000 | Schilling ................ 370/335 |
| 6,125,266 A | 9/2000 | Matero et al. |
| 6,130,910 A | 10/2000 | Anderson et al. |
| 6,130,916 A | 10/2000 | Thomson |
| 6,133,788 A | 10/2000 | Dent |
| 6,133,789 A | 10/2000 | Braithwaite |
| 6,137,355 A | 10/2000 | Sevic et al. |
| 6,147,553 A | 11/2000 | Kolanek |
| 6,154,093 A | 11/2000 | Chen et al. |
| 6,157,253 A | 12/2000 | Sigmon et al. |
| 6,169,455 B1 | 1/2001 | Yamaguchi |
| 6,175,747 B1 | 1/2001 | Tanishima et al. |
| 6,181,199 B1 | 1/2001 | Camp, Jr. et al. |
| 6,188,277 B1 | 2/2001 | Borodulin et al. |
| 6,198,416 B1 | 3/2001 | Velazquez |
| 6,201,452 B1 | 3/2001 | Dent et al. |
| 6,204,735 B1 | 3/2001 | Cairns |
| 6,215,354 B1 | 4/2001 | Kolanek et al. |
| 6,232,838 B1 | 5/2001 | Sugimoto |
| 6,236,688 B1 | 5/2001 | Ohta et al. |
| 6,242,975 B1 | 6/2001 | Eidson et al. |
| 6,246,286 B1 | 6/2001 | Persson |
| 6,246,599 B1 | 6/2001 | Jang et al. |
| 6,252,461 B1 | 6/2001 | Raab |
| 6,256,482 B1 | 7/2001 | Raab |
| 6,259,320 B1 | 7/2001 | Valk et al. |
| 6,285,251 B1 | 9/2001 | Dent et al. |
| 6,292,054 B1 | 9/2001 | Ma et al. |
| 6,295,442 B1 | 9/2001 | Camp, Jr. et al. |
| 6,300,828 B1 | 10/2001 | McInnis |
| 6,304,545 B1 * | 10/2001 | Armbruster et al. ........ 370/210 |
| 6,307,894 B2 | 10/2001 | Eidson et al. |
| 6,311,045 B1 | 10/2001 | Domokos |
| 6,311,046 B1 | 10/2001 | Dent |
| 6,313,703 B1 | 11/2001 | Wright et al. |
| 6,337,599 B2 | 1/2002 | Lee |
| 6,342,812 B1 | 1/2002 | Abdollahian et al. |
| 6,349,216 B1 | 2/2002 | Alberth, Jr. et al. |
| 6,351,189 B1 | 2/2002 | Hirvilampi |
| 6,359,506 B1 | 3/2002 | Camp, Jr. et al. |
| 6,359,508 B1 | 3/2002 | Mucenieks |
| 6,359,513 B1 | 3/2002 | Kuo et al. |
| 6,366,177 B1 | 4/2002 | McCune et al. |
| 6,369,651 B1 | 4/2002 | Dent |
| 6,373,901 B1 | 4/2002 | O'Dea et al. |
| 6,373,902 B1 | 4/2002 | Park et al. |
| 6,374,092 B1 | 4/2002 | Leizerovich et al. |
| 6,380,802 B1 | 4/2002 | Pehike et al. |
| 6,384,680 B1 | 5/2002 | Takei et al. |
| 6,384,681 B1 | 5/2002 | Bonds |
| 6,385,439 B1 | 5/2002 | Hellberg |
| 6,388,513 B1 | 5/2002 | Wright et al. |
| 6,392,483 B2 | 5/2002 | Suzuki et al. |
| 6,396,341 B1 | 5/2002 | Pehlke |
| 6,396,347 B1 | 5/2002 | Lie et al. |
| 6,404,823 B1 | 6/2002 | Grange et al. |
| 6,407,635 B2 | 6/2002 | Mucenieks et al. |
| 6,411,655 B1 | 6/2002 | Holden et al. |
| 6,421,389 B1 | 7/2002 | Jett et al. |
| 6,424,216 B2 | 7/2002 | Mu et al. |
| 6,434,122 B2 | 8/2002 | Barabash et al. |
| 6,437,644 B1 | 8/2002 | Kenington |
| 6,449,465 B1 | 9/2002 | Gailus et al. |
| 6,452,446 B1 | 9/2002 | Eisenberg et al. |
| 6,459,334 B2 | 10/2002 | Wright et al. |
| 6,459,337 B1 | 10/2002 | Goren et al. |
| 6,462,617 B1 | 10/2002 | Kim |
| 6,469,581 B1 | 10/2002 | Kobayashi |
| 6,470,431 B2 | 10/2002 | Nicosia et al. |
| 6,472,934 B1 | 10/2002 | Pehlke |
| 6,472,937 B1 | 10/2002 | Gerard et al. |
| 6,476,670 B1 | 11/2002 | Wright et al. |
| 6,496,062 B1 | 12/2002 | Nitz et al. |
| 6,501,331 B2 | 12/2002 | Adar |
| 6,504,428 B2 | 1/2003 | Cova et al. |
| 6,504,447 B1 | 1/2003 | Laney et al. |
| 6,507,731 B1 | 1/2003 | Hasegawa |
| 6,510,309 B1 | 1/2003 | Thompson et al. |
| 6,510,310 B1 | 1/2003 | Muralidharan |
| 6,512,416 B2 | 1/2003 | Burns et al. |
| 6,522,194 B1 | 2/2003 | Pehlke |
| 6,522,198 B2 | 2/2003 | Ahn |
| 6,522,201 B1 | 2/2003 | Hsiao et al. |
| 6,525,605 B2 | 2/2003 | Hu et al. |
| 6,529,773 B1 | 3/2003 | Dewan |
| 6,531,935 B1 | 3/2003 | Russat et al. |
| 6,535,060 B2 | 3/2003 | Goren et al. |
| 6,538,509 B2 | 3/2003 | Ren |
| 6,538,793 B2 | 3/2003 | Rosenberg et al. |
| 6,545,535 B2 | 4/2003 | Andre |
| 6,552,634 B1 | 4/2003 | Raab |
| 6,566,944 B1 | 5/2003 | Pehlke et al. |
| 6,577,199 B2 | 6/2003 | Dent |
| 6,577,691 B2 | 6/2003 | Richards et al. |
| 6,583,679 B1 | 6/2003 | Cox et al. |
| 6,583,739 B1 | 6/2003 | Kenington |
| 6,586,995 B1 | 7/2003 | Tachibana |
| 6,587,010 B2 | 7/2003 | Wagh et al. |
| 6,587,511 B2 | 7/2003 | Barak et al. |
| 6,587,514 B1 | 7/2003 | Wright et al. |
| 6,587,913 B2 | 7/2003 | Campanale et al. |
| 6,593,806 B1 | 7/2003 | Melanson |
| 6,600,368 B2 | 7/2003 | Kim |
| 6,603,352 B2 | 8/2003 | Wight |
| 6,606,483 B1 | 8/2003 | Baker et al. |
| 6,614,854 B1 | 9/2003 | Chow et al. |
| 6,622,198 B2 | 9/2003 | Jones, Jr. |
| 6,624,694 B2 | 9/2003 | Ma et al. |
| 6,633,200 B2 | 10/2003 | Kolanek |
| 6,636,112 B1 | 10/2003 | McCune |
| 6,637,030 B1 * | 10/2003 | Klein ........................ 725/78 |
| 6,646,505 B2 | 11/2003 | Anderson |
| 6,647,073 B2 | 11/2003 | Tapio |
| 6,653,896 B2 | 11/2003 | Sevic et al. |
| 6,672,167 B2 | 1/2004 | Buell et al. |
| 6,674,326 B1 | 1/2004 | Hiramoto et al. |
| 6,678,041 B2 | 1/2004 | Kimura et al. |
| 6,681,101 B1 | 1/2004 | Eidson et al. |
| 6,683,918 B2 | 1/2004 | Jackson et al. |
| 6,690,232 B2 | 2/2004 | Ueno et al. |
| 6,690,233 B2 | 2/2004 | Sander |
| 6,697,436 B1 | 2/2004 | Wright et al. |
| 6,697,603 B1 | 2/2004 | Lovinggood et al. |

(56) References Cited

U.S. PATENT DOCUMENTS

| | | |
|---|---|---|
| 6,700,440 B2 | 3/2004 | Hareyama |
| 6,700,441 B1 | 3/2004 | Zhang et al. |
| 6,700,453 B2 | 3/2004 | Heiskala et al. |
| 6,701,419 B2 | 3/2004 | Tomaiuolo et al. |
| 6,707,338 B2 | 3/2004 | Kenington et al. |
| 6,714,776 B1 | 3/2004 | Birleson |
| 6,724,252 B2 | 4/2004 | Ngo et al. |
| 6,735,424 B1 | 5/2004 | Larson et al. |
| 6,737,914 B2 | 5/2004 | Gu |
| 6,737,916 B2 | 5/2004 | Luu |
| 6,741,840 B2 | 5/2004 | Nagode et al. |
| 6,741,867 B1 | 5/2004 | Tetsuya |
| 6,750,707 B2 | 6/2004 | Takei et al. |
| 6,751,265 B1 | 6/2004 | Schell et al. |
| 6,757,526 B1 | 6/2004 | Sharp et al. |
| 6,763,062 B1 | 7/2004 | Kohno et al. |
| 6,765,519 B2 | 7/2004 | Karlquist |
| 6,781,534 B2 | 8/2004 | Karlquist |
| 6,784,732 B2 | 8/2004 | Hajimiri et al. |
| 6,784,837 B2 | 8/2004 | Revankar et al. |
| 6,785,342 B1 | 8/2004 | Isaksen et al. |
| 6,791,408 B2 | 9/2004 | Goren et al. |
| 6,791,410 B2 | 9/2004 | Kim et al. |
| 6,794,934 B2 | 9/2004 | Betti-Berutto et al. |
| 6,794,938 B2 | 9/2004 | Weldon |
| 6,798,377 B1 | 9/2004 | Lupash et al. |
| 6,798,843 B2 | 9/2004 | Wright et al. |
| 6,801,086 B1 | 10/2004 | Chandrasekaran |
| 6,801,567 B1 | 10/2004 | Schmidl et al. |
| 6,806,767 B2 | 10/2004 | Dow |
| 6,806,789 B2 | 10/2004 | Bawell et al. |
| 6,819,171 B2 | 11/2004 | Kenington |
| 6,819,176 B1 | 11/2004 | Lee |
| 6,819,720 B1 | 11/2004 | Willetts |
| 6,825,719 B1 | 11/2004 | Barak et al. |
| 6,829,471 B2 | 12/2004 | White et al. |
| 6,831,491 B2 | 12/2004 | Karlquist |
| 6,834,183 B2 | 12/2004 | Black et al. |
| 6,836,183 B2 | 12/2004 | Wight |
| 6,838,942 B1 | 1/2005 | Somerville et al. |
| 6,842,070 B2 | 1/2005 | Nilsson |
| 6,847,266 B2 | 1/2005 | Laney et al. |
| 6,853,244 B2 | 2/2005 | Robinson et al. |
| 6,853,247 B2 | 2/2005 | Weldon |
| 6,853,248 B2 | 2/2005 | Weldon |
| 6,859,098 B2 | 2/2005 | Husseini |
| 6,864,742 B2 | 3/2005 | Kobayashi |
| 6,867,647 B2 | 3/2005 | Wouters |
| 6,873,211 B1 | 3/2005 | Thompson et al. |
| 6,879,209 B2 | 4/2005 | Grundlingh |
| 6,882,217 B1 | 4/2005 | Mueller |
| 6,882,711 B1 | 4/2005 | Nicol |
| 6,882,829 B2 | 4/2005 | Mostov et al. |
| 6,889,034 B1 | 5/2005 | Dent |
| 6,891,432 B2 | 5/2005 | Nagle et al. |
| 6,900,694 B2 | 5/2005 | Suzuki et al. |
| 6,906,585 B2 | 6/2005 | Weldon |
| 6,914,487 B1 | 7/2005 | Doyle et al. |
| 6,917,244 B2 | 7/2005 | Rosnell et al. |
| 6,917,389 B2 | 7/2005 | Lee |
| 6,924,699 B2 | 8/2005 | Ahmed |
| 6,928,272 B2 | 8/2005 | Doi |
| 6,930,547 B2 | 8/2005 | Chandrasekaran et al. |
| 6,937,096 B2 | 8/2005 | Wight et al. |
| 6,937,102 B2 | 8/2005 | Lopez et al. |
| 6,940,349 B2 | 9/2005 | Hellberg |
| 6,943,624 B2 | 9/2005 | Ohnishi et al. |
| 6,947,713 B2 | 9/2005 | Checoury et al. |
| 6,960,956 B2 | 11/2005 | Pehlke et al. |
| 6,970,040 B1 | 11/2005 | Dening |
| 6,975,177 B2 | 12/2005 | Varis et al. |
| 6,980,780 B2 | 12/2005 | Chen et al. |
| 6,987,954 B2 | 1/2006 | Nielsen |
| 6,990,323 B2 | 1/2006 | Prikhodko et al. |
| 6,993,301 B1 | 1/2006 | Kenington et al. |
| 7,010,276 B2 | 3/2006 | Sander et al. |
| 7,015,752 B2 | 3/2006 | Saed |
| 7,023,272 B2 | 4/2006 | Hung et al. |
| 7,026,871 B2 | 4/2006 | Saèd |
| 7,030,714 B2 | 4/2006 | Korol |
| 7,031,382 B2 | 4/2006 | Hessel et al. |
| 7,034,613 B2 | 4/2006 | Saèd |
| 7,035,607 B2 | 4/2006 | Lim et al. |
| 7,042,283 B2 | 5/2006 | Suzuki et al. |
| 7,042,286 B2 | 5/2006 | Meade et al. |
| 7,043,208 B2 | 5/2006 | Nigra |
| 7,043,213 B2 | 5/2006 | Robinson et al. |
| 7,054,296 B1 | 5/2006 | Sorrells et al. |
| 7,054,597 B2 | 5/2006 | Rosnell |
| 7,057,461 B1 | 6/2006 | Canilao et al. |
| 7,064,607 B2 | 6/2006 | Maclean et al. |
| 7,068,099 B2 | 6/2006 | Versteegen |
| 7,068,101 B2 | 6/2006 | Saèd et al. |
| 7,068,103 B2 | 6/2006 | Lind |
| 7,071,774 B2 | 7/2006 | Hellberg |
| 7,071,777 B2 | 7/2006 | McBeath et al. |
| 7,078,976 B2 | 7/2006 | Blednov |
| 7,081,795 B2 | 7/2006 | Matsuura et al. |
| 7,084,702 B1 | 8/2006 | Ichitsubo et al. |
| 7,088,970 B2 | 8/2006 | Williams |
| 7,091,775 B2 | 8/2006 | Ichitsubo et al. |
| 7,091,777 B2 | 8/2006 | Lynch |
| 7,092,675 B2 | 8/2006 | Lim et al. |
| 7,092,676 B2 | 8/2006 | Abdelgany et al. |
| 7,099,382 B2 | 8/2006 | Aronson et al. |
| 7,103,328 B2 | 9/2006 | Zelley |
| 7,132,900 B2 | 11/2006 | Yahagi et al. |
| 7,139,535 B2 | 11/2006 | Zschunke |
| 7,145,397 B2 | 12/2006 | Yamamoto et al. |
| 7,173,980 B2 | 2/2007 | Masenten et al. |
| 7,177,418 B2 | 2/2007 | Maclean et al. |
| 7,184,723 B2 | 2/2007 | Sorrells et al. |
| 7,193,459 B1 | 3/2007 | Epperson et al. |
| 7,197,284 B2 | 3/2007 | Brandt et al. |
| 7,200,369 B2 | 4/2007 | Kim et al. |
| 7,230,996 B2 | 6/2007 | Matsuura et al. |
| 7,242,245 B2 | 7/2007 | Burns et al. |
| 7,248,841 B2 | 7/2007 | Agee et al. |
| 7,260,368 B1 | 8/2007 | Blumer |
| 7,260,369 B2 | 8/2007 | Feher |
| 7,292,189 B2 | 11/2007 | Orr et al. |
| 7,327,803 B2 | 2/2008 | Sorrells et al. |
| 7,345,534 B2 | 3/2008 | Grebennikov |
| 7,345,629 B2 | 3/2008 | Dulmovits, Jr. et al. |
| 7,349,673 B2 | 3/2008 | Moloudi et al. |
| 7,355,470 B2 | 4/2008 | Sorrells et al. |
| 7,378,902 B2 | 5/2008 | Sorrells et al. |
| 7,382,182 B2 | 6/2008 | Trocke et al. |
| 7,403,579 B2 | 7/2008 | Jaffe et al. |
| 7,414,469 B2 | 8/2008 | Sorrells et al. |
| 7,421,036 B2 | 9/2008 | Sorrells et al. |
| 7,423,477 B2 | 9/2008 | Sorrells et al. |
| 7,428,230 B2 | 9/2008 | Park |
| 7,436,894 B2 | 10/2008 | Norris |
| 7,440,733 B2 | 10/2008 | Maslennikov et al. |
| 7,459,893 B2 | 12/2008 | Jacobs |
| 7,460,612 B2 | 12/2008 | Eliezer et al. |
| 7,466,760 B2 | 12/2008 | Sorrells et al. |
| 7,474,695 B2 | 1/2009 | Liu et al. |
| 7,486,894 B2 | 2/2009 | Aronson et al. |
| 7,502,599 B2 | 3/2009 | Ben-Ayun et al. |
| 7,509,102 B2 | 3/2009 | Rofougaran et al. |
| 7,526,261 B2 | 4/2009 | Sorrells et al. |
| 7,560,984 B2 | 7/2009 | Akizuki et al. |
| 7,616,057 B2 | 11/2009 | Sutardja |
| 7,620,129 B2 | 11/2009 | Sorrells et al. |
| 7,639,072 B2 | 12/2009 | Sorrells et al. |
| 7,647,030 B2 | 1/2010 | Sorrells et al. |
| 7,672,648 B1 | 3/2010 | Groe et al. |
| 7,672,650 B2 | 3/2010 | Sorrells et al. |
| 7,738,853 B2 | 6/2010 | Eddy et al. |
| 7,750,733 B2 | 7/2010 | Sorrells et al. |
| RE41,582 E | 8/2010 | Larson et al. |
| 7,778,320 B2 | 8/2010 | Agazzi et al. |

(56) References Cited

U.S. PATENT DOCUMENTS

| | | |
|---|---|---|
| 7,835,709 B2 | 11/2010 | Sorrells et al. |
| 7,844,235 B2 | 11/2010 | Sorrells et al. |
| 7,885,682 B2 | 2/2011 | Sorrells et al. |
| 7,907,671 B2 | 3/2011 | Klomsdorf et al. |
| 7,911,272 B2 | 3/2011 | Sorrells et al. |
| 7,929,989 B2 | 4/2011 | Sorrells et al. |
| 7,932,776 B2 | 4/2011 | Sorrells et al. |
| 7,937,106 B2 | 5/2011 | Sorrells et al. |
| 7,945,224 B2 | 5/2011 | Sorrells et al. |
| 7,949,365 B2 | 5/2011 | Sorrells et al. |
| 7,978,390 B2 | 7/2011 | Kikuchi |
| 8,013,675 B2 | 9/2011 | Sorrells et al. |
| 8,026,764 B2 | 9/2011 | Sorrells et al. |
| 8,031,804 B2 | 10/2011 | Sorrells et al. |
| 8,036,306 B2 | 10/2011 | Sorrells et al. |
| 8,050,353 B2 | 11/2011 | Sorrells et al. |
| 8,059,749 B2 | 11/2011 | Sorrells et al. |
| 8,073,078 B2 | 12/2011 | Kaczman et al. |
| 8,170,081 B2 | 5/2012 | Forenza et al. |
| 8,233,858 B2 | 7/2012 | Sorrells et al. |
| 8,280,321 B2 | 10/2012 | Sorrells et al. |
| 8,315,336 B2 | 11/2012 | Sorrells et al. |
| 8,334,722 B2 | 12/2012 | Sorrells et al. |
| 8,351,870 B2 | 1/2013 | Sorrells et al. |
| 8,355,466 B2 | 1/2013 | Kleider et al. |
| 8,369,807 B2 | 2/2013 | Mikhemar et al. |
| 8,384,484 B2 | 2/2013 | Winslow et al. |
| 8,406,711 B2 | 3/2013 | Sorrells et al. |
| 8,410,849 B2 | 4/2013 | Sorrells et al. |
| 8,428,527 B2 | 4/2013 | Sorrells et al. |
| 8,433,264 B2 | 4/2013 | Sorrells et al. |
| 8,433,745 B2 | 4/2013 | Roger |
| 8,447,248 B2 | 5/2013 | Sorrells et al. |
| 8,461,924 B2 | 6/2013 | Rawlins et al. |
| 8,502,600 B2 | 8/2013 | Rawlins et al. |
| 8,548,093 B2 | 10/2013 | Sorrells et al. |
| 8,577,313 B2 | 11/2013 | Sorrells et al. |
| 8,626,093 B2 | 1/2014 | Sorrells et al. |
| 8,639,196 B2 | 1/2014 | Sorrells et al. |
| 8,755,454 B2 | 6/2014 | Sorrells et al. |
| 8,766,717 B2 | 7/2014 | Sorrells et al. |
| 8,781,418 B2 | 7/2014 | Sorrells et al. |
| 8,884,694 B2 | 11/2014 | Sorrells et al. |
| 8,913,691 B2 | 12/2014 | Sorrells et al. |
| 8,913,974 B2 | 12/2014 | Sorrells et al. |
| 2001/0001008 A1 | 5/2001 | Dent |
| 2001/0004373 A1 | 6/2001 | Hirata |
| 2001/0006354 A1 | 7/2001 | Lee |
| 2001/0006359 A1 | 7/2001 | Suzuki et al. |
| 2001/0011961 A1 | 8/2001 | Rexberg et al. |
| 2001/0030581 A1 | 10/2001 | Dent |
| 2001/0052816 A1 | 12/2001 | Ahn |
| 2002/0008577 A1 | 1/2002 | Cova et al. |
| 2002/0027958 A1 | 3/2002 | Kolanek |
| 2002/0042253 A1 | 4/2002 | Dartois |
| 2002/0047745 A1 | 4/2002 | Kolanek |
| 2002/0053973 A1 | 5/2002 | Ward, Jr. |
| 2002/0058486 A1 | 5/2002 | Persson |
| 2002/0071497 A1 | 6/2002 | Bengtsson et al. |
| 2002/0079962 A1 | 6/2002 | Sander |
| 2002/0084845 A1 | 7/2002 | Eisenberg et al. |
| 2002/0086707 A1 | 7/2002 | Struhsaker et al. |
| 2002/0094034 A1 | 7/2002 | Moriyama |
| 2002/0101907 A1 | 8/2002 | Dent et al. |
| 2002/0105378 A1 | 8/2002 | Tapio |
| 2002/0105384 A1 | 8/2002 | Dent |
| 2002/0125947 A1 | 9/2002 | Ren |
| 2002/0126769 A1 | 9/2002 | Jett et al. |
| 2002/0127986 A1 | 9/2002 | White et al. |
| 2002/0130716 A1 | 9/2002 | Larson et al. |
| 2002/0130727 A1 | 9/2002 | Nagasaka |
| 2002/0130729 A1 | 9/2002 | Larson et al. |
| 2002/0136275 A1 | 9/2002 | Wight |
| 2002/0136325 A1 | 9/2002 | Pehlke et al. |
| 2002/0146996 A1 | 10/2002 | Bachman, II et al. |
| 2002/0153950 A1 | 10/2002 | Kusunoki et al. |
| 2002/0159532 A1 | 10/2002 | Wight |
| 2002/0164965 A1 | 11/2002 | Chominski et al. |
| 2002/0168025 A1 | 11/2002 | Schwent et al. |
| 2002/0171478 A1 | 11/2002 | Wouters |
| 2002/0171485 A1 | 11/2002 | Cova |
| 2002/0172376 A1 | 11/2002 | Bizjak |
| 2002/0180547 A1 | 12/2002 | Staszewski et al. |
| 2002/0183021 A1 | 12/2002 | Brandt |
| 2002/0186079 A1 | 12/2002 | Kobayashi |
| 2002/0191638 A1 | 12/2002 | Wang et al. |
| 2002/0196864 A1 | 12/2002 | Booth et al. |
| 2003/0006845 A1 | 1/2003 | Lopez et al. |
| 2003/0031268 A1 | 2/2003 | Wight |
| 2003/0041667 A1 | 3/2003 | White |
| 2003/0083026 A1 | 5/2003 | Liu |
| 2003/0087625 A1 | 5/2003 | Conti |
| 2003/0098753 A1 | 5/2003 | Wagh et al. |
| 2003/0102910 A1 | 6/2003 | Sevic et al. |
| 2003/0102914 A1 | 6/2003 | Kenington et al. |
| 2003/0107435 A1 | 6/2003 | Gu |
| 2003/0114124 A1 | 6/2003 | Higuchi |
| 2003/0118121 A1 | 6/2003 | Makinen |
| 2003/0119526 A1 | 6/2003 | Edge |
| 2003/0123566 A1 | 7/2003 | Hasson |
| 2003/0125065 A1 | 7/2003 | Barak et al. |
| 2003/0132800 A1 | 7/2003 | Kenington |
| 2003/0143967 A1 | 7/2003 | Ciccarelli et al. |
| 2003/0179041 A1 | 9/2003 | Weldon |
| 2003/0190895 A1 | 10/2003 | Mostov et al. |
| 2003/0201835 A1 | 10/2003 | Dening et al. |
| 2003/0210096 A1 | 11/2003 | Pengelly et al. |
| 2003/0210746 A1 | 11/2003 | Asbeck et al. |
| 2003/0219067 A1 | 11/2003 | Birkett et al. |
| 2003/0220086 A1 | 11/2003 | Birkett |
| 2003/0228856 A1 | 12/2003 | Orihashi et al. |
| 2003/0231057 A1 | 12/2003 | Hiramoto et al. |
| 2004/0008081 A1 | 1/2004 | Friedel et al. |
| 2004/0021517 A1 | 2/2004 | Irvine et al. |
| 2004/0025104 A1 | 2/2004 | Amer |
| 2004/0027198 A1 | 2/2004 | Chandrasekaran et al. |
| 2004/0037363 A1* | 2/2004 | Norsworthy et al. ......... 375/259 |
| 2004/0037378 A1 | 2/2004 | Komori et al. |
| 2004/0046524 A1 | 3/2004 | Zschunke |
| 2004/0052312 A1 | 3/2004 | Matero |
| 2004/0056723 A1 | 3/2004 | Gotou |
| 2004/0062397 A1 | 4/2004 | Amer |
| 2004/0075492 A1 | 4/2004 | Wight |
| 2004/0076238 A1 | 4/2004 | Parker et al. |
| 2004/0085134 A1 | 5/2004 | Griffith et al. |
| 2004/0092281 A1 | 5/2004 | Burchfiel |
| 2004/0095192 A1 | 5/2004 | Krvavac |
| 2004/0101065 A1 | 5/2004 | Hagh et al. |
| 2004/0108896 A1 | 6/2004 | Midtgaard |
| 2004/0113698 A1 | 6/2004 | Kim et al. |
| 2004/0119477 A1 | 6/2004 | Kazemi-Nia |
| 2004/0119514 A1 | 6/2004 | Karlquist |
| 2004/0119622 A1 | 6/2004 | Karlquist |
| 2004/0119624 A1 | 6/2004 | Karlquist |
| 2004/0125006 A1 | 7/2004 | Tani et al. |
| 2004/0131131 A1 | 7/2004 | Peach et al. |
| 2004/0135630 A1 | 7/2004 | Hellberg |
| 2004/0142667 A1 | 7/2004 | Lochhead et al. |
| 2004/0146116 A1 | 7/2004 | Kang et al. |
| 2004/0166813 A1 | 8/2004 | Mann et al. |
| 2004/0169559 A1 | 9/2004 | Weldon |
| 2004/0172583 A1 | 9/2004 | Amer |
| 2004/0174213 A1 | 9/2004 | Thompson |
| 2004/0181745 A1 | 9/2004 | Amer |
| 2004/0184559 A1 | 9/2004 | Ballantyne |
| 2004/0185805 A1 | 9/2004 | Kim et al. |
| 2004/0189380 A1 | 9/2004 | Myer et al. |
| 2004/0189381 A1 | 9/2004 | Louis |
| 2004/0196899 A1 | 10/2004 | Zhou et al. |
| 2004/0198263 A1 | 10/2004 | Ode et al. |
| 2004/0222851 A1 | 11/2004 | Weldon |
| 2004/0224715 A1 | 11/2004 | Rosenlof et al. |
| 2004/0227570 A1 | 11/2004 | Jackson et al. |
| 2004/0233599 A1 | 11/2004 | Busking |

(56) References Cited

U.S. PATENT DOCUMENTS

| | | |
|---|---|---|
| 2004/0246060 A1 | 12/2004 | Varis et al. |
| 2004/0251962 A1 | 12/2004 | Rosnell et al. |
| 2004/0263242 A1 | 12/2004 | Hellberg |
| 2004/0263245 A1 | 12/2004 | Winter et al. |
| 2004/0263246 A1 | 12/2004 | Robinson et al. |
| 2004/0266059 A1 | 12/2004 | Wight et al. |
| 2004/0266365 A1 | 12/2004 | Hasson et al. |
| 2004/0266368 A1 | 12/2004 | Rosnell |
| 2004/0266374 A1 | 12/2004 | Saed et al. |
| 2004/0267399 A1 | 12/2004 | Funk |
| 2005/0001674 A1 | 1/2005 | Saed et al. |
| 2005/0001675 A1 | 1/2005 | Saed |
| 2005/0001676 A1 | 1/2005 | Saed |
| 2005/0001677 A1 | 1/2005 | Saed |
| 2005/0001678 A1 | 1/2005 | Saed |
| 2005/0001679 A1 | 1/2005 | Saed |
| 2005/0002470 A1 | 1/2005 | Saed et al. |
| 2005/0003770 A1 | 1/2005 | Saed |
| 2005/0007194 A1 | 1/2005 | Grundlingh |
| 2005/0012547 A1 | 1/2005 | Kwon et al. |
| 2005/0018787 A1 | 1/2005 | Saed |
| 2005/0024262 A1 | 2/2005 | Cantrell et al. |
| 2005/0025181 A1 | 2/2005 | Nazari |
| 2005/0047038 A1 | 3/2005 | Nakajima et al. |
| 2005/0058059 A1 | 3/2005 | Amer |
| 2005/0058193 A1 | 3/2005 | Saed |
| 2005/0058209 A1 | 3/2005 | Magrath |
| 2005/0058227 A1 | 3/2005 | Birkett et al. |
| 2005/0058228 A1 | 3/2005 | Birkett |
| 2005/0073360 A1 | 4/2005 | Johnson et al. |
| 2005/0073374 A1 | 4/2005 | Korol |
| 2005/0088226 A1 | 4/2005 | Robinson et al. |
| 2005/0110590 A1 | 5/2005 | Korol |
| 2005/0111574 A1 | 5/2005 | Muller et al. |
| 2005/0118973 A1 | 6/2005 | Khlat |
| 2005/0129140 A1 | 6/2005 | Robinson |
| 2005/0129141 A1 | 6/2005 | Lee |
| 2005/0136864 A1 | 6/2005 | Zipper |
| 2005/0141640 A1 | 6/2005 | Maruyama |
| 2005/0181746 A1 | 8/2005 | Wight |
| 2005/0191976 A1 | 9/2005 | Shakeshaft et al. |
| 2005/0195031 A1 | 9/2005 | Grundlingh |
| 2005/0201483 A1 | 9/2005 | Coersmeier |
| 2005/0215206 A1 | 9/2005 | Granstrom et al. |
| 2005/0227646 A1 | 10/2005 | Yamazaki et al. |
| 2005/0242879 A1 | 11/2005 | Muller |
| 2005/0253652 A1 | 11/2005 | Song et al. |
| 2005/0253745 A1 | 11/2005 | Song et al. |
| 2005/0260956 A1 | 11/2005 | Loraine et al. |
| 2006/0006946 A1 | 1/2006 | Burns et al. |
| 2006/0017500 A1 | 1/2006 | Hellberg |
| 2006/0035618 A1 | 2/2006 | Pleasant |
| 2006/0052068 A1 | 3/2006 | Sander et al. |
| 2006/0052124 A1 | 3/2006 | Pottenger et al. |
| 2006/0055458 A1 | 3/2006 | Shiikuma et al. |
| 2006/0066396 A1 | 3/2006 | Brandt |
| 2006/0068707 A1 | 3/2006 | Greeley |
| 2006/0088081 A1 | 4/2006 | Withington et al. |
| 2006/0142821 A1 | 6/2006 | Bange et al. |
| 2006/0160502 A1 | 7/2006 | Kintis |
| 2006/0220625 A1 | 10/2006 | Chapuis |
| 2006/0238245 A1 | 10/2006 | Carichner et al. |
| 2006/0262889 A1 | 11/2006 | Kalvaitis et al. |
| 2006/0264190 A1 | 11/2006 | Aleiner |
| 2006/0291589 A1 | 12/2006 | Eliezer et al. |
| 2006/0292999 A1 | 12/2006 | Sorrells et al. |
| 2006/0293000 A1 | 12/2006 | Sorrells et al. |
| 2007/0019757 A1 | 1/2007 | Matero |
| 2007/0021080 A1 | 1/2007 | Kuriyama et al. |
| 2007/0030063 A1 | 2/2007 | Izumi et al. |
| 2007/0050758 A1 | 3/2007 | Arevalo et al. |
| 2007/0071114 A1 | 3/2007 | Sanderford et al. |
| 2007/0076814 A1 | 4/2007 | Ikeda et al. |
| 2007/0082630 A1 | 4/2007 | Aridas et al. |
| 2007/0087708 A1 | 4/2007 | Sorrells et al. |
| 2007/0087709 A1 | 4/2007 | Sorrells et al. |
| 2007/0090874 A1 | 4/2007 | Sorrells et al. |
| 2007/0096806 A1 | 5/2007 | Sorrells et al. |
| 2007/0111686 A1 | 5/2007 | Lee |
| 2007/0127563 A1 | 6/2007 | Wu et al. |
| 2007/0155344 A1 | 7/2007 | Wiessner et al. |
| 2007/0184790 A1 | 8/2007 | Gilbertson et al. |
| 2007/0190952 A1 | 8/2007 | Waheed et al. |
| 2007/0194986 A1 | 8/2007 | Dulmovits, Jr. et al. |
| 2007/0218852 A1 | 9/2007 | Huynh |
| 2007/0247217 A1 | 10/2007 | Sorrells et al. |
| 2007/0247220 A1 | 10/2007 | Sorrells et al. |
| 2007/0247221 A1 | 10/2007 | Sorrells et al. |
| 2007/0248156 A1 | 10/2007 | Sorrells et al. |
| 2007/0248185 A1 | 10/2007 | Sorrells et al. |
| 2007/0248186 A1 | 10/2007 | Sorrells et al. |
| 2007/0249299 A1 | 10/2007 | Sorrells et al. |
| 2007/0249300 A1 | 10/2007 | Sorrells et al. |
| 2007/0249301 A1 | 10/2007 | Sorrells et al. |
| 2007/0249302 A1 | 10/2007 | Sorrells et al. |
| 2007/0249304 A1 | 10/2007 | Snelgrove et al. |
| 2007/0291668 A1 | 12/2007 | Duan |
| 2008/0003960 A1 | 1/2008 | Zolfaghari |
| 2008/0019459 A1 | 1/2008 | Chen et al. |
| 2008/0072025 A1 | 3/2008 | Staszewski et al. |
| 2008/0089252 A1 | 4/2008 | Choi |
| 2008/0133982 A1 | 6/2008 | Rawlins et al. |
| 2008/0225929 A1 | 9/2008 | Proctor et al. |
| 2008/0225935 A1 | 9/2008 | Reddy |
| 2008/0259846 A1 | 10/2008 | Gonikberg et al. |
| 2008/0272841 A1 | 11/2008 | Sorrells et al. |
| 2008/0299913 A1 | 12/2008 | Han et al. |
| 2008/0311860 A1 | 12/2008 | Tanaka et al. |
| 2009/0004981 A1 | 1/2009 | Eliezer et al. |
| 2009/0063070 A1 | 3/2009 | Renneberg |
| 2009/0070568 A1 | 3/2009 | Shi et al. |
| 2009/0091384 A1 | 4/2009 | Sorrells et al. |
| 2009/0134947 A1 | 5/2009 | Tarng |
| 2009/0201084 A1 | 8/2009 | See et al. |
| 2009/0227214 A1 | 9/2009 | Georgantas et al. |
| 2009/0238249 A1 | 9/2009 | Van Waasen et al. |
| 2009/0262861 A1 | 10/2009 | Nielsen |
| 2009/0262877 A1 | 10/2009 | Shi et al. |
| 2010/0013527 A1 | 1/2010 | Warnick |
| 2010/0103052 A1 | 4/2010 | Ying |
| 2010/0311353 A1 | 12/2010 | Teillet et al. |
| 2010/0329395 A1 | 12/2010 | Kang et al. |
| 2011/0099406 A1 | 4/2011 | Bell |
| 2011/0300885 A1 | 12/2011 | Darabi et al. |
| 2012/0025624 A1 | 2/2012 | Lee et al. |
| 2012/0153731 A9 | 6/2012 | Kirby et al. |
| 2012/0263215 A1 | 10/2012 | Peng |
| 2012/0321007 A1 | 12/2012 | Feher |
| 2013/0101074 A1 | 4/2013 | Hickling |
| 2013/0122973 A1 | 5/2013 | Caskey |

FOREIGN PATENT DOCUMENTS

| | | |
|---|---|---|
| EP | 0 630 104 A2 | 12/1994 |
| EP | 0 708 546 A2 | 4/1996 |
| EP | 0 471 346 B1 | 11/1996 |
| EP | 0 639 307 B1 | 12/1997 |
| EP | 0 821 304 A1 | 1/1998 |
| EP | 0 725 478 B1 | 8/1998 |
| EP | 0 892 529 A2 | 1/1999 |
| EP | 0 897 213 A1 | 2/1999 |
| EP | 0 598 585 B1 | 3/1999 |
| EP | 0 630 104 B1 | 8/2000 |
| EP | 0 821 304 B1 | 2/2002 |
| EP | 1 068 666 B1 | 5/2003 |
| EP | 1 381 154 A1 | 1/2004 |
| EP | 0 897 213 B1 | 3/2004 |
| EP | 1 487 100 A1 | 12/2004 |
| EP | 1 332 550 B1 | 3/2005 |
| EP | 1 142 250 B1 | 4/2005 |
| EP | 1 521 359 A1 | 4/2005 |
| EP | 1 583 228 A2 | 10/2005 |
| GB | 2159374 A | 11/1985 |
| GB | 2 267 402 | 12/1993 |

(56) References Cited

FOREIGN PATENT DOCUMENTS

| | | | |
|---|---|---|---|
| JP | 54-022749 A | 2/1979 |
| JP | 60-63517 A | 4/1985 |
| JP | 1-284106 A | 11/1989 |
| JP | 2-87708 A | 3/1990 |
| JP | 3-232307 A | 10/1991 |
| JP | 4-095409 A | 3/1992 |
| JP | 4-104604 A | 4/1992 |
| JP | 5-22046 A | 1/1993 |
| JP | 5-037263 A | 2/1993 |
| JP | 6-338728 A | 12/1994 |
| JP | H08-163189 A | 6/1996 |
| JP | 9-018536 A | 1/1997 |
| JP | 9-074320 A | 3/1997 |
| JP | 10-70451 A | 3/1998 |
| JP | 2000-209291 A | 7/2000 |
| JP | 2000-244261 A | 9/2000 |
| JP | 2001-136057 A | 5/2001 |
| JP | 2001-217659 A | 8/2001 |
| JP | 2001-308650 A | 11/2001 |
| JP | 3-276923 A | 12/2001 |
| JP | 2002-543729 A | 12/2002 |
| JP | 2003-298357 A | 10/2003 |
| JP | 2003-298361 A | 10/2003 |
| JP | 2004-260707 A | 9/2004 |
| JP | 2005-101940 A | 4/2005 |
| JP | 2005-151543 A | 6/2005 |
| RO | 102824 | 11/1991 |
| RO | 100466 | 8/1992 |
| SU | 1322183 A1 | 7/1987 |
| WO | WO 94/21035 | 9/1994 |
| WO | WO 96/10310 | 4/1996 |
| WO | WO 96/19063 | 6/1996 |
| WO | WO 97/41642 | 11/1997 |
| WO | WO 97/48219 | 12/1997 |
| WO | WO 99/23755 | 5/1999 |
| WO | WO 99/52206 | 10/1999 |
| WO | WO 00/41371 | 7/2000 |
| WO | WO 00/67370 | 11/2000 |
| WO | WO 01/03292 | 1/2001 |
| WO | WO 01/45205 | 6/2001 |
| WO | WO 01/91282 | 11/2001 |
| WO | WO 02/39577 | 5/2002 |
| WO | WO 02/082633 | 10/2002 |
| WO | WO 02/084864 A2 | 10/2002 |
| WO | WO 03/047093 | 6/2003 |
| WO | WO 03/061115 | 7/2003 |
| WO | WO 2004/023647 | 3/2004 |
| WO | WO 2004/036736 | 4/2004 |
| WO | WO 2004/057755 | 7/2004 |
| WO | WO 2005/031966 | 4/2005 |
| WO | WO 2005/036732 | 4/2005 |
| WO | WO 2005/055413 | 6/2005 |

OTHER PUBLICATIONS

English Abstract for Japanese Patent Publication No. JP 2000-244261 A, published Sep. 8, 2000, downloaded from http://worldwide.espacenet.com, 1 page.
English Abstract for Japanese Patent Publication No. JP 2001-217659 A, published Aug. 10, 2001, downloaded from http://worldwide.espacenet.com, 1 page.
English Abstract for Japanese Patent Publication No. JP 2001-308650 A, published Nov. 2, 2001, downloaded from http://worldwide.espacenet.com, 1 page.
English Abstract for Japanese Patent Publication No. JP 2002-543729 A, published Dec. 17, 2002, downloaded from http://worldwide.espacenet.com, 1 page.
English Abstract for Japanese Publication No. JP 5-037263 A, published Feb. 12, 1993, downloaded from http://worldwide.espacenet.com, 1 page.
English Abstract for Japanese Patent Publication No. JP 2005-101940 A, published Apr. 14, 2005, downloaded from http://worldwide.espacenet.com, 1 page.
English Abstract for Japanese Patent Publication No. JP H08-163189 A, published Jun. 21, 1996, downloaded from http://worldwide.espacenet.com, 2 pages.
Englsh Abstract for Japanese Patent Publication No. JP 2003-298361 A, published Oct. 17, 2003, downloaded from http://worldwide.espacenet.com, 2 pages.
Notification of Transmittal of the International Search Report and Written Opinion, dated Aug. 14, 2012, for PCT Appl. No. PCT/US2012/040500, 9 pages.
Notification of Transmittal of the International Search Report and Written Opinion, dated Aug. 14, 2012, for PCT Appl. No. PCT/US2012/032791, 7 pages.
Harlan, G. et al, "Dynamically-Configurable Multimode Transmitter Systems for Wireless Handsets, Cognitive Radio and SDR Applications," *IEEE International Conference on Microwaves, Communications, Antennas and Electronics Systems*, Nov. 9, 2009, pp. 1-5.
Rawlins, G. and Sorrells, D., "A Thermodynamic Theory of RF Power Transmitters with an Example," *IEEE 10th Annual Wireless and Microwave Technology Conference*, Apr. 20, 2009, pp. 1-5.
Rawlins, G. et al., "Using an IQ Data to RF Power Transmitter to Realize a Highly-Efficient Transmit Chain for Current and Next-Generation Mobile Handsets," *Proceedings of the 38th European Microwave Conference*, Oct. 27, 2008, pp. 579-582.
Jang, M. et al., "Linearity Improvement of Power Amplifier Using Modulation of Low Frequency IMD Signals," *Asia-Pacific Microwave Conference Proceedings*, vol. 2, pp. 1156-1159, Dec. 4-7, 2005.
Woo, W. et al., "A Hybrid Digital/RF Envelope Predistortion Linearization System for Power Amplifiers," *IEEE Transactions on Microwave Theory and Techniques*, vol. 53, No. 1, pp. 229-237, Jan. 2005.
Notification of Transmittal of the International Search Report and Written Opinion, dated Apr. 27, 2010, for PCT Application No. PCT/US2009/057306, 11 pages.
English Abstract for Japanese Patent Publication No. JP 2005-151543 A, downloaded from http://v3.espacenet.com, 1 page, Jun. 9, 2005.
"Ampliphase AM transmission system," *ABU Technical Review*, No. 33, p. 10-18 (Jul. 1974).
"Designing an SSB Outphaser," *Electronics World*, pp. 306-310 (Apr. 1996).
"New 50 KW Ampliphase AM Transmitter," *RCA in Broadcast News*, No. 111, pp. 36-39 (Jun. 1961).
*The Ampliphase Page*: Ampliphase—A quick description. . ., Reproduction of text from http://rossrevenge.co.uk/tx/ampli.htm, 13 pages (visited Jan. 18, 2006).
Ajluni, C., "Chip Set Withstands WLAN's Future Blows," at http://www.wsdmag.com/Articles/Print.cfm?ArticleID=6792, 5 pages (Oct. 2003).
Ampen-Darko, S. and Al-Raweshidy, H.S., "Gain/phase imbalance cancellation technique in LINC transmitters," *Electronics Letters*, vol. 34, No. 22, pp. 2093-2094 (Oct. 29, 1988).
Ampen-Darko, S.O. and Al-Raweshidy, H.S., "A Novel Technique for Gain/Phase Cancellation in LINC Transmitters," *IEEE VTS—50thVehicular Technology Conference*, Amsterdam, pp. 2034-2038 (Sep. 19-22, 1999).
Andreani, P., *Linear PA architectures (Chapter 13)*, available at http://server.oersted.dtu.dk/personal/pa/31636/pdf/paLin.pdf, 10 pages, date unknown.
Ariyavisitakul, S. and Lie, T.P., "Characterizing the Effects of Nonlinear Amplifiers on Linear Modulation for Digital Portable Radio Communications," *IEEE Transactions on Vehicular Technology*, vol. 39, No. 4, pp. 383-389 (Nov. 1990).
*ARMMS—The RF and Microwave Society—Last Meeting*, at http://www.armms.org/last.html, 4 pages (printed Apr. 14, 2005).
Asbeck, P.M. et al., "Power Amplifier Approaches for High Efficiency and Linearity," in Itoh, T. et al. (eds.), *RF Technologies for Low Power Wireless Communications*, ISBN No. 0-471-38267-1, pp. 189-227 (2001).
Asbeck, P.M. et al., "Synergistic Design of DSP and Power Amplifiers for Wireless Communications," *IEEE Transactions on Microwave Theory and Techniques*, vol. 49, No. 11, pp. 2163-2169 (Nov. 2001).

(56) References Cited

OTHER PUBLICATIONS

Banelli, P., "Error Sensitivity in Adaptive Predistortion Systems," *Global Telecommunications Conference—Globecom'99*, pp. 883-888 (1999).

Bateman, A., et al., "The Application of Digital Signal Processing to Transmitter Linearisation," *EUROCON 88: 8th European Conference on Electrotechnics*, pp. 64-67 (Jun. 13-17, 1988).

Bespalov, V.B. and Aslamazyan, A.S., "Broadband Strip-Line SHF Ampliphasemeter," *Measurement Techniques (Translated from Russian)*, vol. 25, No. 8, pp. 712-715 (Aug. 1982).

Birafane, A. and Kouki, A., "An Analytical Approach to LINC Power Combining Efficiency Estimation and Optimization," *33rd European Microwave Conference—Munich*, pp. 1227-1229 (2003).

Birafane, A. and Kouki, A., "Distortion Free LINC Amplifier with Chireix-Outphasing Combiner Using Phase-Only Predistortion," *34th European Microwave Conference—Amsterdam*, pp. 1069-1072 (2004).

Birafane, A. and Kouki, A., "On the Linearity and Efficiency of Outphasing Microwave Amplifiers," *IEEE Transactions on Microwave Theory and Techniques*, vol. 52, No. 7, pp. 1702-1708 (Jul. 2004).

Birafane, A. and Kouki, A., "Sources of Linearity Degradation in LINC Transmitters for Hybrid and Outphasing Combiners," *Canadian Conference on Electrical and Computer Engineering—Niagara Falls*, pp. 547-550 (May 2004).

Birafane, A. and Kouki, A.B., "Phase-Only Predistortion for LINC Amplifiers With Chireix-Outphasing Combiners," *IEEE Transactions on Microwave Theory and Techniques*, vol. 53, No. 6, pp. 2240-2250 (Jun. 2005).

Breed, G., "Intermodulation Distortion Performance and Measurement Issues," *High Frequency Electronics*, p. 56(2) (May 2003).

Bruckmann, H., "Modulation Arrangements and Operating Costs of Broadcasting and Radio-Telephony Transmitters," *Telegraphen-Fernsprech-Funk-und Fernsehtechnik*, vol. 24, pp. 83-91 (Apr. 1935).

Casadevall, F. and Olmos, J.J., "On the Behavior of the LINC Transmitter," *40th IEEE Vehicular Technology Conference*, pp. 29-34 (May 6-9, 1990).

Casadevall, F.J. and Valdovinos, A., "Performance Analysis of QAM Modulations Applied to the LINC Transmitter," *IEEE Transactions on Vehicular Technology*, vol. 42, No. 4, pp. 399-406 (Nov. 1993).

Casadevall, F.J., "The LINC Transmitter", *RF Design*, pp. 41-48 (Feb. 1990).

Cha, J. et al., "Highly Efficient Power Amplifier for CDMA Base Stations Using Doherty Configuration," *IEEE MTT-S International Microwave Symposium Digest*, pp. 533-536 (2004).

Chan, K.Y. et al., "Analysis and Realisation of the LINC Transmitter using the Combined Analogue Locked Loop Universal Modulator (CALLUM)," *IEEE 44th Vehicular Technology Conference*, vol. 1, pp. 484-488 (Jun. 8-10, 1994).

Chen, J.-T. et al., "The Optimal RLS Parameter Tracking Algorithm for a Power Amplifier Feedforward Linearizer," *IEEE Transactions on Circuits and Systems-II: Analog and Digital Signal Processing*, vol. 46, No. 4, pp. 464-468 (Apr. 1999).

Chireix, H., "High Power Outphasing Modulation" *Proceedings of the Institute of Radio Engineers*, vol. 23, No. 11, pp. 1370-1392 (Nov. 1935).

Choi, L.U., *Multi-user MISO and MIMO Transmit Signal Processing for Wireless Communication*, PhD Thesis submitted to the Hong Kong University of Science and Technology, 191 pages, Mar. 2003.

Clark, G., "A Comparison of AM Techniques," *ABU Technical Review*, No. 44, p. 33-42, (May 1976).

Clark, G., "A Comparison of Current Broadcast Amplitude Modulation Techniques", *IEEE Transactions on Broadcasting*, vol. BC-21, No. 2, pp. 25-31 (Jun. 1975).

Clifton, J.C. et al., "Novel Multimode J-pHEMT Front-End Architecture With Power-Control Scheme for Maximum Efficiency," *IEEE Transactions on Microwave Theory and Techniques*, vol. 53, No. 6, pp. 2251-2258 (Jun. 2005).

Colantonio, P., "High Linearity and Efficiency Microwave PAs," *12th GAAS Symposium—Amsterdam*, pp. 183-186 (2004).

*Computational Science Research Center Colloquium—Time Reversal Bases Communications in Complex Environments*, Friday, Apr. 9, 2004, 2 pages, printed Jul. 14, 2006 from http://www.sdsunivers.info/info_content_event.asp?id=15044.

Conradi, C.P. et al., "Evaluation of a Lossless Combiner in a LINC Transmitter," *Proceedings of the 1999 IEEE Canadian Conference on Electrical Computer Engineering*, pp. 105-110 (May 9-12, 1999).

Couch, L. and Walker, J.L., "A VHF LINC Amplifier," *Proceedings of IEEE Southeastcon*, pp. 122-125 (1982).

*Course #08: Advanced RF Power Amplifier Techniques for Modern Wireless and Microwave Systems*, from http://www.cei.se/008.htm, 6 pages (printed Apr. 14, 2005).

*Course #114: Advanced RF Power Amplifier Techniques*, from http://www.bessercourse.com/outlinesOnly.asp?CTID=114, 3 pages (printed Jun. 22, 2005).

Cox, "Component Signal Separation and Recombination for Linear Amplification with Nonlinear Components," *IEEE Transactions on Communications*, vol. COM-23, No. 11, pp. 1281-1287 (Nov. 1975).

Cox, D.C. and Leck, R.P., "A VHF Implementation of a LINC Amplifier," *IEEE Transactions on Communications*, pp. 1018-1022 (Sep. 1976).

Cox, D.C., "Linear Amplification with Nonlinear Components," *IEEE Transactions on Communications*, vol. COM-22, pp. 1942-1945 (Dec. 1974).

Cripps, S.C., *Advanced Techniques in RF Power Amplifier Design*, Section 2—"Doherty and Chireix," pp. 33-72, Artech House (2002).

Cripps, Steve C., *PA Linearisation in RFICs . . . . . . ignoring the obvious?*, available at http://www.cei.se/pa_milan.ppt, Hywave Associates, 24 pages (Created Aug. 2, 2001).

Cripps, Steve C., *RF Power Amplifiers for Wireless Communications*, Artech House, ISBN No. 0890069891, pp. 240-250 (Apr. 1999).

Deltimple, N. et at, "A Reconfigurable RF Power Amplifier Biasing Scheme", *Proceedings of the 2nd Annual IEEE Northeast Workshop on Circuits and Systems (NEWCAS2004)*, pp. 365-368, (Jun. 20-23, 2004).

Dennis, A., "A Novel Digital Transmitter Architecture for Multimode/Multiband Applications: DTX, A Technology of MACOM," Tyco Electronics, 32 pages (date unknown).

Dinis, R. et al., "Performance Trade-Offs with Quasi-Linearly Amplified OFDM Through a Two-Branch Combining Technique," *IEEE 46th Vehicular Technology Conference*, pp. 899-903 (Apr. 28-May 1, 1996).

Ellinger, F. et al., "Calibratable Adaptive Antenna Combiner at 5.2 GHz with High Yield for Laptop Interface Card," *IEEE Transactions on Microwave Theory and Techniques*, vol. 48, No. 12, pp. 2714-2720 (Dec. 2000).

Faust, H.H. et al., "A Spectrally Clean Transmitting System for Solid-State Phased-Array Radars," *Proceedings of the 2004 IEEE Radar Conference*, pp. 140-144 (Apr. 26-Apr. 29, 2004).

Fisher, S.T., "A New Method of Amplifying with High Efficiency a Carrier Wave Modulated in Amplitude by a Voice Wave," *Proceedings of the Institute of Radio Engineers*, vol. 34, pp. 3-13P (Jan. 1946).

Garcia, P. et al., "An Adaptive Digital Method of Imbalances Cancellation in LINC Transmitters," *IEEE Transactions on Vehicular Technology*, vol. 54, No. 3, pp. 879-888 (May 2005).

Gaudemack, L.F., "A Phase-Opposition System of Amplitude Modulation," *IRE Proceedings*, vol. 26, No. 8, pp. 983-1008 (Aug. 1938).

Gentzler, C.G. and Leong, S.K., "Broadband VHF/UHF Amplifier Design Using Coaxial Transformers," *High Frequency Electronics*, pp. 42, 44, 46, 48, 50, and 51 (May 2003).

Gerhard, W. and Knöchel, R., "Digital Component Separator for future W-CDMA-LINC Transmitters implemented on an FPGA," *Advances in Radio Science*, 3, pp. 239-246 (2005).

Grundlingh, J. et al., "A High Efficiency Chireix Out-phasing Power Amplifier for 5GHz WLAN Applications," *IEEE MTT-S International Microwave Symposium Digest*, vol. 3, pp. 1535-1538 (2004).

Hakala, I. et al., "A 2.14-GHz Chireix Outphasing Transmitter," *IEEE Transactions on Microwave Theory and Techniques*, vol. 53, No. 6, pp. 2129-2138 (Jun. 2005).

(56) References Cited

OTHER PUBLICATIONS

Hakala, I. et al., "Chireix Power Combining with Saturated Class-B Power Amplifiers," *Conference Proceedings, 34th European Microwave Conference*, pp. 379-382 (2004).

Hamedi-Hagh, S. and Salama, A.T., "CMOS Wireless Phase-Shifted Transmitter," *IEEE Journal of Solid-State Circuits*, vol. 39, No. 8, pp. 1241-1252 (Aug. 2004).

Hammond, R. and Henry, J., "High Power Vector Summation Switching Power Amplifier Development," *IEEE Power Electronics Specialists Conference (PESC)*, pp. 267-272 (Jun. 29-Jul. 3, 1981).

Heiden, D., "Principle of a phase constant and low distortion amplitude modulation system for transistor transmitters," *Nachrichtentechnische Zeitschrift*, vol. 23, No. 12, pp. 608-612 (Dec. 1970).

Hetzel, S.A. et al., "LINC Transmitter," *Electronics Letters*, vol. 27, No. 10, pp. 844-846 (May 9, 1991).

Internet Postings at "*Class E-AM Forum*" :: *View topic—What exactly is class D?*, at http://classe.monkeypuppet.com/viewtopic.php?t=220, 6 pages (Dec. 14-17, 2003).

Iwamoto, M. et at, "An Extended Doherty Amplifier with High Efficiency Over a Wide Power Range," *IEEE Transactions on Microwave Theory and Techniques*, vol. 49, No. 12, pp. 2472-2479 (Dec. 2001).

Jeong, Y.-C., *Linearizing Principles on High Power Amplifier*, Chonbuk National University School of Electronics & Information Engineering, 41 pages (Oct. 26, 2004).

Karn, P., *Re: [amsat-bb] AO-40 Satellite Rf Architecture Question*, at http://www.uk/amsat.org/ListArchives/amsat-bb/2002/msg01409.html, 2 pages (Feb. 25, 2002).

Katz, A., *Linearization: Reducing Distortion in Power Amplifiers*, The College of New Jersey, 52 pages (Apr. 16, 2004).

Kaunisto, R., "A Vector-Locked Loop for Power Amplifier Linearization," *IEEE MTT-S International Microwave Symposium Digest*, 4 pages (Jun. 6-11, 2004).

Kelly, W.M. et al., "Vector Modulator, Output Amplifier, and Multiplier Chain Assemblies for a Vector Signal Generator," *Hewlett-Packard Journal*, vol. 38, No. 11, pp. 48-52 (Dec. 1987).

Kenington, P.B. et al., "Broadband Linearisation of High-Efficiency Power Amplifiers," *Proceedings of the Third International Mobile Satellite Conference*, pp. 59-64 (1993).

Kim, I. et al., "The linearity and efficiency enhancement using 3-way Doherty amplifier with uneven power drive," *International Technical Conference on Circuits/Systems, Computers and Communications*, Jeju, Korea, pp. 369-370 (Jul. 2005).

Kim, J. et al., "Optimum Operation of Asymmetrical-Cells-Based Linear Doherty Power Amplifiers—Uneven Power Drive and Power Matching," *IEEE Transactions on Microwave Theory and Techniques*, vol. 53, No. 5, pp. 1802-1809 (May 2005).

Kosugi, H. et al., "A High-Efficiency Linear Power Amplifier Using an Envelope Feedback Method," *Electronics and Communications in Japan*, Part 2, vol. 77, No. 3, pp. 50-57 (1994).

Kurzrok, R., "Simple Lab-Built Test Accessories for RF, IF, Baseband and Audio," *High Frequency Electronics*, pp. 60 and 62-64 (May 2003).

Langridge, R. et al., "A Power Re-Use Technique for Improved Efficiency of Outphasing Microwave Power Amplifiers," *IEEE Transactions on Microwave Theory and Techniques*, vol. 47, No. 8, pp. 1467-1470 (Aug. 1999).

Li, C. et al., "Optimal IDM-MISO Transmit Strategy with Partial CSI at Transmitter," 6 pages, downloaded Jun. 2006 from http://www288.pair.com/ciss/ciss/numbered/36.pdf.

Love, D.J. et al., "Grassmannian Beamforming for Multiple-Input Multiple-Output Wireless Systems," pp. 1-29, downloaded Jun. 2006 from http://www.math.ucclavis.edu/~strohmer/papers/2003/grassbeam.ps.gz, Jun. 3, 2003.

Lyles, J.T.M., *[Amps] Amplifuzz[TSPA]*, at http://lists.contesting.com/pipermail/amps/2005-January/042303.html, 2 pages (Jan. 28, 2005).

*Manuals and Schematics*, at http://www.lks.net/~radio/Pages/manuals.htm, 8 pages (last update Aug. 23, 2005).

Masse, D., "Advanced Techniques in RF Power Amplifier Design," *Microwave Journal (International Edition)*, vol. 45, Issue 9, p. 216 (Sep. 2002).

Masse, D., "Design of Linear RF Outphasing Power Amplifiers," *Microwave Journal (International Edition)*, vol. 47, Issue 7, p. 152 (Jul. 2004).

McCune, E., "High-Efficiency, Multi-Mode Multi-Band Terminal Power Amplifiers," *IEEE Microwave Magazine*, vol. 6, No. 1, pp. 44-55 (Mar. 2005).

McPherson, D.S. et al., "A 28 GHz HBT Vector Modulator and Its Application to an LMCS Feedforward Power Amplifier," *28thEuropean Microwave Conference—Amsterdam*, vol. 1, pp. 523-528 (1998).

*Mead Education: Information Registration: RF Transceivers and Power Amplifiers*, at http://www.mead.ch/htm/ch/bios_texte/RF-PA_05_text.html, 3 pages (printed Sep. 1, 2005).

Morais, D.H. and Feher, K., "NLA-QAM: A Method for Generating High-Power QAM Signals Through Nonlinear Amplification," *IEEE Transactions on Communications*, vol. COM-30, No. 3, pp. 517-522 (Mar. 1982).

Moustakas, A.L. and Simon, S.H., "Optimizing multiple-input single-output (MISO) communication systems with general Gaussian channels; nontrivial covariance and nonzero mean," *IEEE Transactions on Information Theory*, vol. 49, Issue 10, pp. 2770-2780, Oct. 2003.

Musson, D.R., "Ampliphase . . . For Economical Super-Power AM Transmitters", *Broadcast News*, vol. No. 119, pp. 24-29 (Feb. 1964).

Norris, G.B. et al., "A Fully Monolithic 4-18 GHZ Digital Vector Modulator," *IEEE MTT-S International Microwave Symposium Diges*, pp. 789-792 (1990).

Olson, S.A. and Stengel, R.E., "LINC Imbalance Correction using Baseband Preconditioning," *Proceedings IEEE Radio Wireless Conference*, pp. 179-182 (Aug. 1-4, 1999).

Pereyra, L. A., "Modulation techniques for radiodiffusion transmitters," *Revista Telegrafica Electronica*, vol. 67, No. 801, pp. 1132-1138 and 1148 (Oct. 1979).

Pigeon, M., "A CBC Engineering Report: Montreal Antenna Replacement Project," *Broadcast Technology*, vol. 15, No. 4, pp. 25-27 (Jan. 1990).

Poitau, G. et al., "Experimental Characterization of LINC Outphasing Combiners' Efficiency and Linearity," *Proceedings IEEE Radio and Wireless Conference*, pp. 87-90 (2004).

Price, T.H., "The Circuit Development of the Ampliphase Broadcasting Transmitter," *The Proceedings of the Institution of Electrical Engineers*, vol. 101, pp. 391-399 (1954).

Qiu, R.C. et al., "Time Reversal with MISO for Ultra-Wideband Communications: Experimental Results (*invited paper*)," 4 pages, downloaded Jun. 2006 from http://iweb.tntech.edu/rqiu/paper/conference/RWS06Qiu_TH2B1.pdf.

Raab, F.H. et al., "Power Amplifiers and Transmitters for RF and Microwave," *IEEE Transactions on Microwave Theory and Techniques*, vol. 50, No. 3, pp. 814-826 (Mar. 2002).

Raab, F.H. et al., "RF and Microwave Power Amplifier and Transmitter Technologies—Part 1," *High Frequency Electronics*, pp. 22, 24, 26, 28, 29, 30, 32, 34, and 36 (May 2003).

Raab, F.H. et al., "RF and Microwave Power Amplifier and Transmitter Technologies—Part 3," *High Frequency Electronics*, pp. 34, 36, 38, 40, 42-44, 46, and 48 (2003).

Raab, F.H. et al., "RF and Microwave Power Amplifier and Transmitter Technologies—Part 5," *High Frequency Electronics*, pp. 46, 48-50, 52, and 54 (2004).

Raab, F.H., "Efficiency of Doherty RF-Power Amplifier Systems," *IEEE Transactions on Broadcasting*, vol. BC-33, No. 3, pp. 77-83 (Sep. 1987).

Raab, F.H., "Efficiency of Outphasing RF Power-Amplifier Systems," *IEEE Transactions on Communications*, vol. COM-33, No. 10, pp. 1094-1099 (Oct. 1985).

Rabjohn, G. and Wight, J., "Improving Efficiency, Output Power with 802.11a Out-Phasing PAs," at htm://www.us.design-reuse.com/articles/article6937.html, 8 pages (Jan. 9, 2004).

(56) References Cited

OTHER PUBLICATIONS

Rustako, A.J. and Yeh, Y.S., "A Wide-Band Phase-Feedback Inverse-Sine Phase Modulator with Application Toward a LINC Amplifier," *IEEE Transactions on Communications*, vol. COM-24, No. 10, pp. 1139-1143 (Oct. 1976).
Saleh, A.A.M. and Cox, D.C., "Improving the Power-Added Efficiency of FET Amplifiers Operating with Varying-Envelope Signals," *IEEE Transactions on Microwave Theory and Techniques*, vol. 31, No. 1, pp. 51-56 (Jan. 1983).
Saraga, W., "A new version of the out-phasing (quadrature-modulation) method for frequency translation (SSB generation and detection)," *Transmission Aspects of Communications Networks*, pp. 131-134 (1964).
Shi, B. and Sundström, L., "A 200-MHz IF BiCMOS Signal Component Separator for Linear LINC Transmitters," *IEEE Journal of Solid-State Circuits*, vol. 35, No. 7, pp. 987-993 (Jul. 2000).
Shi, B. and Sundströmm, L., "A Voltage-Translinear Based CMOS Signal Component Separator Chip for Linear LINC Transmitters," *Analog Integrated Circuits and Signal Processing*, 30, pp. 31-39 (2002).
Shi, B. And Sundströmm, L., "Investigation of a Highly Efficient LINC Amplifier Topology," *Proceedings IEEE 45th Vehicular Technology Conference*, vol. 2, pp. 1215-1219 (Oct. 7-11, 2001).
Shin, B. et al., "Linear Power Amplifier based on 3-Way Doherty Amplifier with Predistorter," *IEEE MTT-S International Microwave Symposium Digest*, pp. 2027-2030 (2004).
Simon, M. and Weigel, R., "A Low Noise Vector Modulator with integrated Basebandfilter in 120 nm CMOS Technology," *2003 IEEE Radio Frequency Integrated Circuits Symposium*, pp. 409-412 (2003).
Skarbek, I. "New High-Efficiency 5-KW AM Transmitter 'Unique Class C Amplifier Operates with 90% Efficiency'," *RCE Broadcast News # 107*, pp. 8-13 (Mar. 1960).
Sokal, N. O., "RF Power Amplifiers, Classes A though S—How they Operate, and When to Use Each," *Electronics Industries Forum of New England, Professional Program Proceedings*, Boston, MA, pp. 179-252 (1997).
Staudinger, J. et al, "High Efficiency CDMA RF Power Amplifier Using Dynamic Envelope Tracking Technique," *IEEE MTT-S International Microwave Symposium Digest*, vol. 2, pp. 873-876 (Jun. 11-16, 2000).
Stengel, B. and Eisenstadt, W.R., "LINC Power Amplifier Combiner Method Efficiency Optimization," *IEEE Transactions on Vehicular Technology*, vol. 49, No. 1, pp. 229-234 (Jan. 2000).
Sundströmm, L. "Spectral Sensitivity of LINC Transmitters to Quadrature Modulator Misalignments," *IEEE Transactions on Vehicular Technology*, vol. 49, No. 4, pp. 1474-1487 (Jul. 2000).
Sundströmm, L., "Automatic adjustment of gain and phase imbalances in LINC transmitters," *Electronics Letters*, vol. 31, No. 3, pp. 155-156 (Feb. 2, 1995).
Sundströmm, L., "Effect of modulation scheme on LINC transmitter power efficiency," *Electronics Letters*, vol. 30, No. 20, pp. 1643-1645 (Sep. 29, 1994).
Sundströmm, L., "Effects of reconstruction filters and sampling rate for a digital signal component separator on LINC transmitter performance," *Electronics Letters*, vol. 31, No. 14, pp. 1124-1125 (Jul. 6, 1995).
Sundströmm, L., "The Effect of Quantization in a Digital Signal Component Separator for LINC Transmitters," *IEEE Transactions on Vehicular Technology*, vol. 45, No. 2, pp. 346-352 (May 1996).
Sundströmm, L., *Digital RF Power Amplifier Linearisers Analysis and Design*, Department of Applied Electronics, Lund University, pp. i-x and 1-64 (1995).
Tan, J. S. and Gardner, P., "A LINC Demonstrator Based On Switchable Phase Shifters," *Microwave and Optical Technology Letters*, vol. 35, No. 4, pp. 262-264 (Nov. 20, 2002).
Tchamov, N. T., *Power Amplifiers*, Tampere University of Technology, Institute of Communications Engineering, RF-ASIC Laboratory, 26 pages (May 17, 2004).

*TDP: RCA BHF-100A*, at http://www.transmitter.be/rca-bhf100a.html, 8 pages (printed Jun. 15, 2005).
*The Ampliphase Ancestry*, at http://www.rossrevenge.co.uk/tx/ancest.htm, 8 pages, (latest update Aug. 2002).
Tomisato, S. et al., "Phase Error Free LINC Modulator," *Electronics Letters*, vol. 25, No. 9, pp. 576-577 (Apr. 27, 1989).
Ullah, I., "Exciter Modulator For An Ampliphase Type Broadcast Transmitter," *ABU Technical Review*, No. 62, pp. 21-27 (May 1979).
Ullah, I., "Output Circuit Of An Ampliphase Broadcast Transmitter," *ABU Technical Review*, No. 63, pp. 17-24 (Jul. 1979).
Vasyukov, V.V. et al., "The Effect of Channel Phase Asymmetry on Nonlinear Distortions in Modulation by Dephasing," *Radioelectronics and Communications Systems*, vol. 28, No. 4, pp. 8687 (1985).
Venkataramani, M., *Efficiency Improvement of WCDMA Base Station Transmitters using Class-F power amplifiers*, Thesis, Virginia Polytechnic Institute, Blacksburg, Virginia, pp. i-xi and 1-55 (Feb. 13, 2004).
Virmani, B.D., "Phase-to-amplitude modulation," *Wireless World*, vol. 61, No. 4, pp. 183-187 (Apr. 1955).
Wang, F. et al., "Envelope Tracking Power Amplifier with Pre-Distortion Linearization for WLAN 802.11g," *2004 IEEE MTT-S International Microwave Symposium Digest*, vol. 3, pp. 1543-1546 (Jun. 6-11, 2004).
Whitaker, Jerry C., *Power Vacuum Tubes Handbook* (*Electronics Handbook Series*), CRC Publishing, ISBN No. 0849313457, pp. 236-238 (May 1999).
Wight, J., "Computational microwave circuits arrive," at http://www.eetimes.com/showArticle.jhtml?articleID=18900752, EE Times, 3 pages (Apr. 12, 2004).
Wilds, R.B., "An S-Band Two-Phase Demodulator," pp. 48-53 (date unknown).
Woo, Y.Y. et al., "SDR Transmitter Based on LINC Amplifier with Bias Control," *IEEE MTT-S International Microwave Symposium Digest*, pp. 1703-1706 (2003).
Ya, S. et al., "A C-Band Monolithic Vector Modulator," *Research & Progress of SSE*, vol. 14, No. 4, pp. 302-306 (Nov. 1994).
Yang, Y. et al., "A Fully Matched N-Way Doherty Amplifier With Optimized Linearity," *IEEE Transactions on Microwave Theory and Techniques*, vol. 51, No. 3. pp. 986-993 (Mar. 2003).
Yang, Y. et al., "A Microwave Doherty Amplifier Employing Envelope Tracking Technique for High Efficiency and Linearity," *IEEE Microwave and Wireless Components Letters*, vol. 13, No. 9, pp. 370-372 (Sep. 2003).
Yang, Y. et al., "Experimental Investigation on Efficiency and Linearity of Microwave Doherty Amplifier," IEEE, 4 pages (2001).
Yang, Y. et al., "Optimum Design for Linearity and Efficiency of a Microwave Doherty Amplifier Using a New Load Matching Technique," *Microwave Journal*, 8 pages (Dec. 1, 2001).
Yankin, V. A., "Effect of quantization, amplifier noise and the parameters of the calibration elements on the accuracy of measurement using a six-port microwave ampliphasemeter," *Radioelectronics and Communication Systems*, vol. 32, No. 8, pp. 110-112 (1989).
Yao, J. and Long, S.I., "High Efficiency Switching-Mode Amplifier for Mobile and Base Station Applications," Final Report 2002-03 for MICRO Project 02-044, 4 pages (2002-2003).
Yao, J. et al., "High Efficiency Switch Mode Amplifiers for Mobile and Base Station Applications," Final Report 2000-2001 for MICRO Project 00-061, 4 pages (2000-2001).
Yi, J. et al., "Effect of efficiency optimization on linearity of LINC amplifiers with CDMA signal," *IEEE MTT-S International Microwave Symposium Digest*, vol. 2, pp. 1359-1362 (May 2001).
Zhang, X., *An Improved Outphasing Power Amplifier System for Wireless Communications*, Dissertation, University of California, San Diego, pp. i-xvii and 1-201 (2001).
Zhang, X. and Larson, L.E., "Gain and Phase Error-Free LINC Transmitter," *IEEE Transactions on Vehicular Technology*, vol. 49, No. 5, pp. 1986-1994 (Sep. 2000).
Zhang, X. et al. "Gain/Phase Imbalance-Minimization Techniques for LINC Transmitters," *IEEE Transactions on Microwave Theory and Techniques*, vol. 49, No. 12, pp. 2507-2516 (Dec. 2001).
Zhang, X. et al., "A Gain/Phase Imbalance Minimization Technique for LINC Transmitter," *IEEE MTT-S International Microwave Symposium Digest*, pp. 801-804 (2001).

(56) References Cited

OTHER PUBLICATIONS

Zhang, X, et al., "Analysis of Power Recycling Techniques for RF and Microwave Outphasing Power Amplifiers," *IEEE Transactions on Circuits and Systems II: Analog and Digital Signal Processing*, vol. 49, No. 5, p. 312-320 (May 2002).
Zhang, X. et al., "Calibration scheme for LINC transmitter," *Electronics Letters*, vol. 37, No. 5, pp. 317-318 (Mar. 1, 2001).
Zhang, X. et al., *Design of Linear RF Outphasing Power Amplifiers*, entire book, Artech House, ISBN No. 1-58053-374-4 (2003).
Zhong, S.S. and Cui, J.H., "A New Dual Polarized Aperture-Coupled Printer Array for SAR Applications," *Journal of Shanghai University (English Edition)*, vol. 5, No. 4, pp. 295-298 (Dec. 2001).
English Abstract for European Patent Publication No. EP 0 639 307 B1, downloaded from http://vs.espacenet.com, 1 page, Dec. 3, 1997.
English Abstract for European Patent Publication No. EP 0 708 546 A2, downloaded from http://vs.espacenet.com, 1 page, Apr. 24, 1996.
English Abstract for European Patent Publication No. EP 0 892 529 A2, downloaded from http://vs.espacenet.com, 1 page, Jan. 20, 1999.
English Abstract for Japanese Patent Publication No. JP 60-63517 A, downloaded from http://vs.espacenet.com, 1 page, Apr. 11, 1985.
English Abstract for Japanese Patent Publication No. JP 2-87708 A, downloaded from http://vs.espacenet.com, 1 page, Mar. 28, 1990.
English Abstract for Japanese Patent Publication No. JP 3-232307 A, downloaded from http://vs.espacenet.com, 1 page, Oct. 16, 1991.
English Abstract for Japanese Patent Publication No. JP 5-22046 A, downloaded from http://vs.espacenet.com, 1 page, Jan. 29, 1993.
English Abstract for Japanese Patent Publication No. JP 6-338728 A, downloaded from http://vs.espacenet.com, 1 page, Dec. 6, 1994.
English Abstract for Japanese Patent Publication No. JP 10-70451 A, downloaded from http://vs.espacenet.com, 1 page, Mar. 10, 1998.
English Abstract for Japanese Patent Publication No. JP 2001-136057 A, downloaded from http://vs.espacenet.com, 1 page, May 18, 2001.
English Abstract for Japanese Patent Publication No. JP 2004-260707 A, downloaded from http://vs.espacenet.com, 1 page, Sep. 16, 2004.
English Abstract for Romanian Patent Publication No. RO 10824, downloaded from http://vs.espacenet.com, 1 page, Nov. 18, 1991.
English Translation for Romanian Patent Publication No. RO 100466, obtained from Transperfect Translations, 4 pages, Aug. 20, 1992.
English Translation for Russian Patent Publication No. SU 1322183 A1, obtained from Transperfect Translations, 2 pages, Jul. 7, 1987.
Notification of Transmittal of the International Search Report and Written Opinion, dated Mar. 4, 2008, for PCT Application No. PCT/US07/06197, 8 pages.
Notification of Transmittal of the International Search Report and Written Opinion, dated Aug. 15, 2008, for PCT Application No. PCT/US08/06360, 6 pages.
Notification of Transmittal of the International Search Report and Written Opinion, dated Sep. 3, 2008, for PCT Application No. PCT/US2008/008118, 6 pages.
Notification of Transmittal of the International Search Report and Written Opinion, dated Sep. 8, 2008, for PCT Application No. PCT/US2008/007623, 6 pages.
Silverman, L. and Del Plato, C., "Vector Modulator Enhances Feedforward Cancellation," *Microwaves & RF*, pp. 1-4 (Mar. 1998).
Notification of Transmittal of the International Search Report and Written Opinion, dated Jul. 7, 2009, for PCT Application No. PCT/US09/03212, 6 pages.
English Abstract for Japanese Patent Publication No. JP 1-284106 A, published Nov. 15, 1989, downloaded from http://v3.espacenet.com, 1 page.
English Abstract for Japanese Patent Publication No. JP 4-095409 A, published Mar. 27, 1992, downloaded from http://v3.espacenet.com, 1 page.
English Abstract for Japanese Patent Publication No. JP 4-104604 A, published Apr. 7, 1992, downloaded from http://v3.espacenet.com, 1 page.
English Abstract for Japanese Patent Publication No. JP 9-018536 A, published Jan. 17, 1997, downloaded from http://v3.espacenet.com, 1 page.
English Abstract for Japanese Patent Publication No. JP 9-074320 A, published Mar. 18, 1997, downloaded from http://v3.espacenet.com, 1 page.
English Abstract for Japanese Patent Publication No. JP 2000-209291 A, published Jul. 28, 2000, downloaded from http://v3.espacenet.com, 1 page.
English Abstract for Japanese Patent Publication No. JP 2003-298357 A, published Oct. 17, 2003, downloaded from http://v3.espacenet.com, 1 page.
English Abstract for Japanese Patent Publication No. JP 3-276923 A, published Dec. 9, 1991, downloaded from http://worldwide.espacenet.com, 2 pages.
NPL2 Notification of Transmittal of the International Search Report and Written Opinion, dated Dec. 31, 2014, for PCT Appl. No. PCT/US2014/056086, 18 pages.

* cited by examiner

E-UTRA Frequency Bands

| E-UTRA Band | Uplink (UL) $F_{ul\_low} - F_{ul\_high}$ | Downlink (DL) $F_{dl\_low} - F_{dl\_high}$ | UL-DL Band Separation $F_{dl\_low} - F_{ul\_high}$ | Duplex Mode | RX – TX Separation |
|---|---|---|---|---|---|
| 1 | 1920 MHz – 1980 MHz | 2110 MHz – 2170 MHz | 130 MHz | FDD | 190 MHz |
| 2 | 1850 MHz – 1910 MHz | 1930 MHz – 1990 MHz | 20 MHz | FDD | 80 MHz |
| 3 | 1710 MHz – 1785 MHz | 1805 MHz – 1880 MHz | 20 MHz | FDD | 95 MHz |
| 4 | 1710 MHz – 1755 MHz | 2110 MHz – 2155 MHz | 355 MHz | FDD | 400 MHz |
| 5 | 824 MHz – 849 MHz | 869 MHz – 894 MHz | 20 MHz | FDD | 45 MHz |
| 8 | 880 MHz – 915 MHz | 925 MHz – 960 MHz | 10 MHz | FDD | 45 MHz |

FIG. 4

GSM Mobile and Base Transmit Frequency Bands

| Band | Mobile Transmit, Base Receive* | Base Transmit, Mobile Receive* | Band Separation and Minimum RX-TX Separation | Duplex Mode |
|---|---|---|---|---|
| GSM 850 | 824 MHz to 849 MHz | 869 MHz to 894 MHz | 20 MHz | TDD |
| Primary GSM 900 (P-GSM) | 890 MHz to 915 MHz | 935 MHz to 960 MHz | 20 MHz | TDD |
| Extended GSM 900 (E-GSM) | 880 MHz to 915 MHz | 925 MHz to 960 MHz | 20 MHz | TDD |
| DCS 1800 | 1710 MHz to 1785 MHz | 1805 MHz to 1880 MHz | 20 MHz | TDD |
| PCS 1900 | 1850 MHz to 1910 MHz | 1930 MHz to 1990 MHz | 20 MHz | TDD |

FIG. 5

CDMA2000 Frequency Bands

| Band | MS Band (up link) | Access (down link) | RX – TX | Duplex Mode |
|---|---|---|---|---|
| Band Class 0 | 824 MHz to 849 MHz | 869 MHz to 894 MHz | 45 MHz | FDD |

FIG. 6

| Operating Band | Uplink (mobile station transmit) Frequencies in MHz | | Downlink (mobile station receive) Frequencies in MHz | | Primary Approved Locations | Communication Standards Supported |
|---|---|---|---|---|---|---|
| | Lower Frequency Limit | Upper Frequency Limit | Lower Frequency Limit | Upper Frequency Limit | | |
| I | 1920 | 1980 | 2110 | 2170 | Europe, Asia | HSUPA, WCDMA |
| II | 1850 | 1910 | 1930 | 1990 | North America, South America | HSUPA, WCDMA, GSM, EDGE |
| III | 1710 | 1785 | 1805 | 1880 | | GSM, EDGE |
| IV | 1710 | 1755 | 2110 | 2155 | United States (T-Mobile) | |
| V | 824 | 849 | 869 | 894 | North America, South America, Asia, Australia | HSUPA, WCDMA, GSM, EDGE |
| VI | 830 | 840 | 875 | 885 | Japan | HSUPA, WCDMA, GSM, EDGE |
| VII | 2500 | 2570 | 2620 | 2690 | Europe, Asia, Australia | GSM, EDGE |
| VIII | 880 | 915 | 925 | 960 | | |
| IX | 1749.9 | 1784.9 | 1844.9 | 1879.9 | | |
| X | 1710 | 1770 | 2110 | 2170 | | |
| XI | 1427.9 | 1452.9 | 1475.9 | 1500.9 | | |
| XII | 698 | 716 | 728 | 746 | North America | |
| XIII | 777 | 787 | 746 | 756 | North America | |
| XIV | 788 | 798 | 758 | 768 | North America | |

FIG. 7

SYSTEMS AND METHODS OF RF POWER TRANSMISSION, MODULATION, AND AMPLIFICATION

CROSS-REFERENCE TO RELATED APPLICATIONS

The present application claims the benefit of U.S. Provisional Patent Application No. 61/056,347 filed on May 27, 2008 and U.S. Provisional Patent Application No. 61/129,027 filed on May 30, 2008 all of which are incorporated herein by reference in their entireties.

The present application is related to U.S. patent application Ser. No. 11/256,172, filed Oct. 24, 2005, now U.S. Pat. No. 7,184,723 and U.S. patent application Ser. No. 11/508,989, filed Aug. 24, 2006, now U.S. Pat. No. 7,355,470 both of which are incorporated herein by reference in their entireties.

BACKGROUND OF THE INVENTION

1. Field of the Invention

The present invention relates generally to RF (radio frequency) power transmission, modulation, amplification, reception, and demodulation.

2. Background Art

A main objective in the design of high-speed mobile communication transceivers is to enable the transceiver to support as many communication applications as possible, which allows the transceiver to operate over as many major networks worldwide as possible. However, as TX-RX isolation requirements vary from one communication application to another, enabling a worldwide operable transceiver requires meeting the TX-RX isolation requirement of each of the supported communication applications.

BRIEF SUMMARY OF THE INVENTION

The present invention relates generally to RF power transmission, modulation, amplification, reception, and demodulation.

Embodiments of the present invention reduce or eliminate the need for fixed frequency high Q band filtering for both fall duplex (FDD) and half duplex (TDD) systems. In traditional architectures, the fixed frequency high Q band filter requirements are met using surface acoustic wave (SAW) filters and duplexers.

Transceiver architectures according to embodiments of the present invention can be designed to have a single input/output for both FDD and TDD based standards. Further, according to embodiments, because the duplexer and/or SAW power losses are lowered or removed altogether, the system power output requirements can be met more easily and with higher efficiency.

Further still, according to embodiments, the transmitter chain can be connected directly to the antenna, without any intervening fixed filter elements. In addition, according to embodiments, multiple frequency bands can be covered by a single design without having to provide multiple fixed frequency SAW filters and duplexers and/or multiple switches and control signals. As a result, the design complexity, cost, and size of embodiments of the present invention are significantly reduced compared to conventional architectures.

According to embodiments of the present invention, all required transmit and receive specifications can be met simultaneously, including the TX-RX noise floor requirements which are often very close in frequency or have a small frequency offset. Further, according to embodiments, this is achieved by only shaping the transmit waveform, without applying any modifications to the receive chain(s) of the transceiver.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 4-6 illustrate frequency allocations for various frequency bands associated with different mobile communication standards.

FIG. 7 illustrates the operating frequency bands for the FDD-mode of UMTS (Universal Mobile Telecommunications System).

Figure 10:
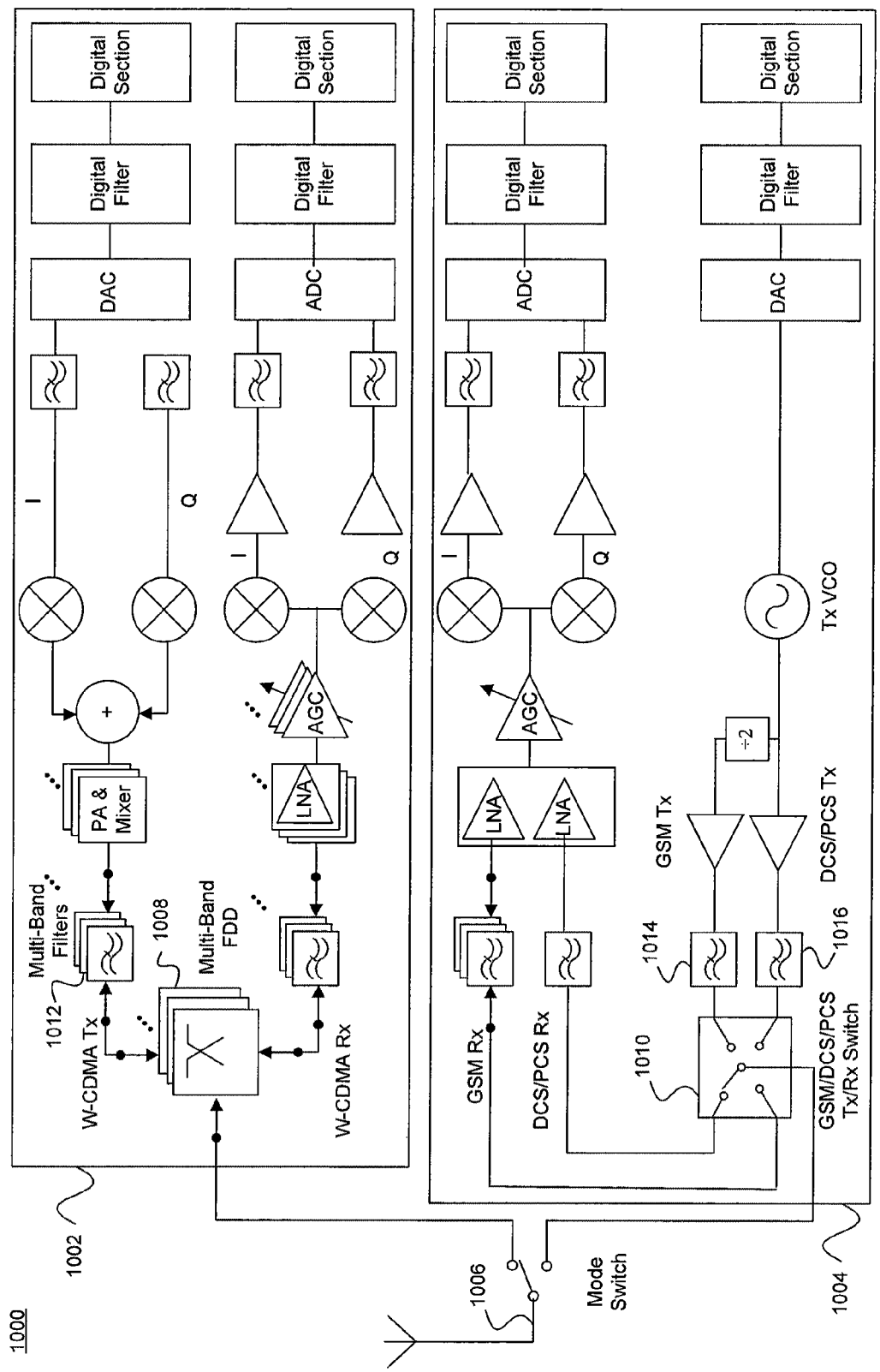

FIG. 10. illustrates a conventional transceiver architecture

Figure 11:
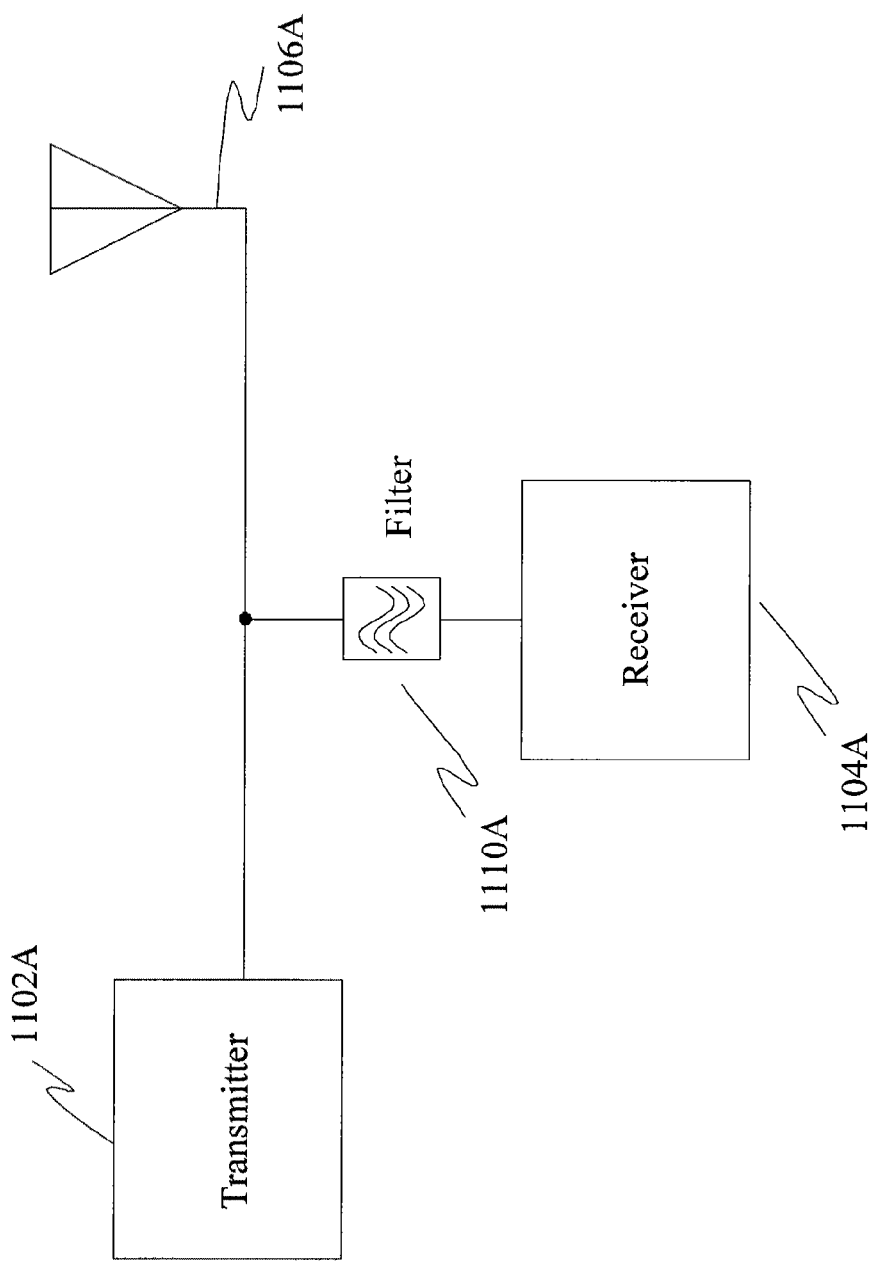

FIG. 11 is a block diagram that illustrates an example FDD section architecture according to an embodiment of the present invention.

Figure 12:
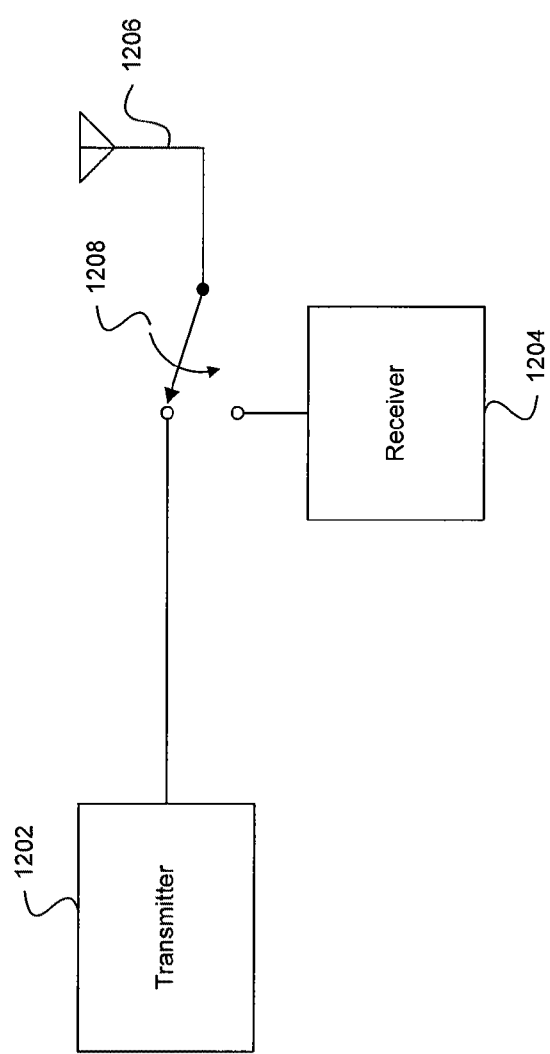

FIG. 12 is a block diagram that illustrates an example TDD section architecture according to an embodiment of the present invention.

Figure 13:
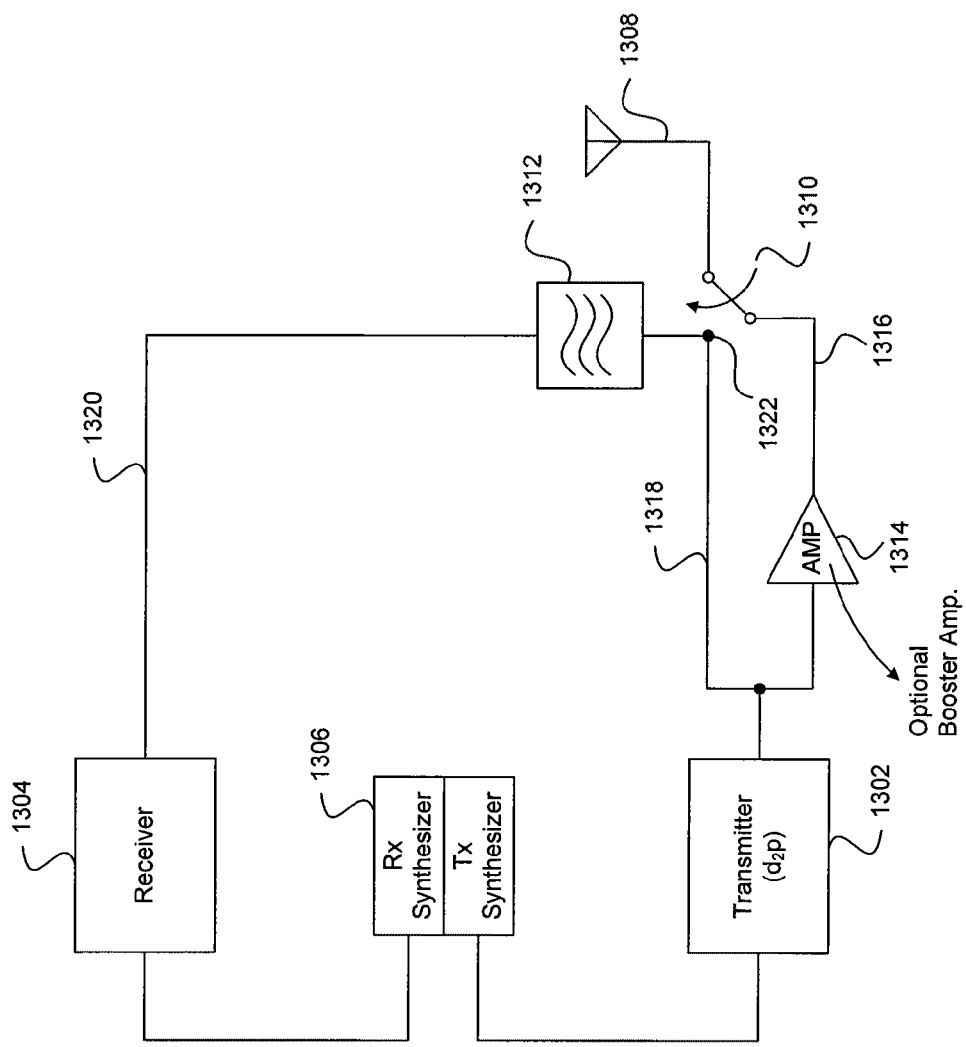

FIG. 13 illustrates an example transceiver architecture according to an embodiment of the present invention.

Figure 14:
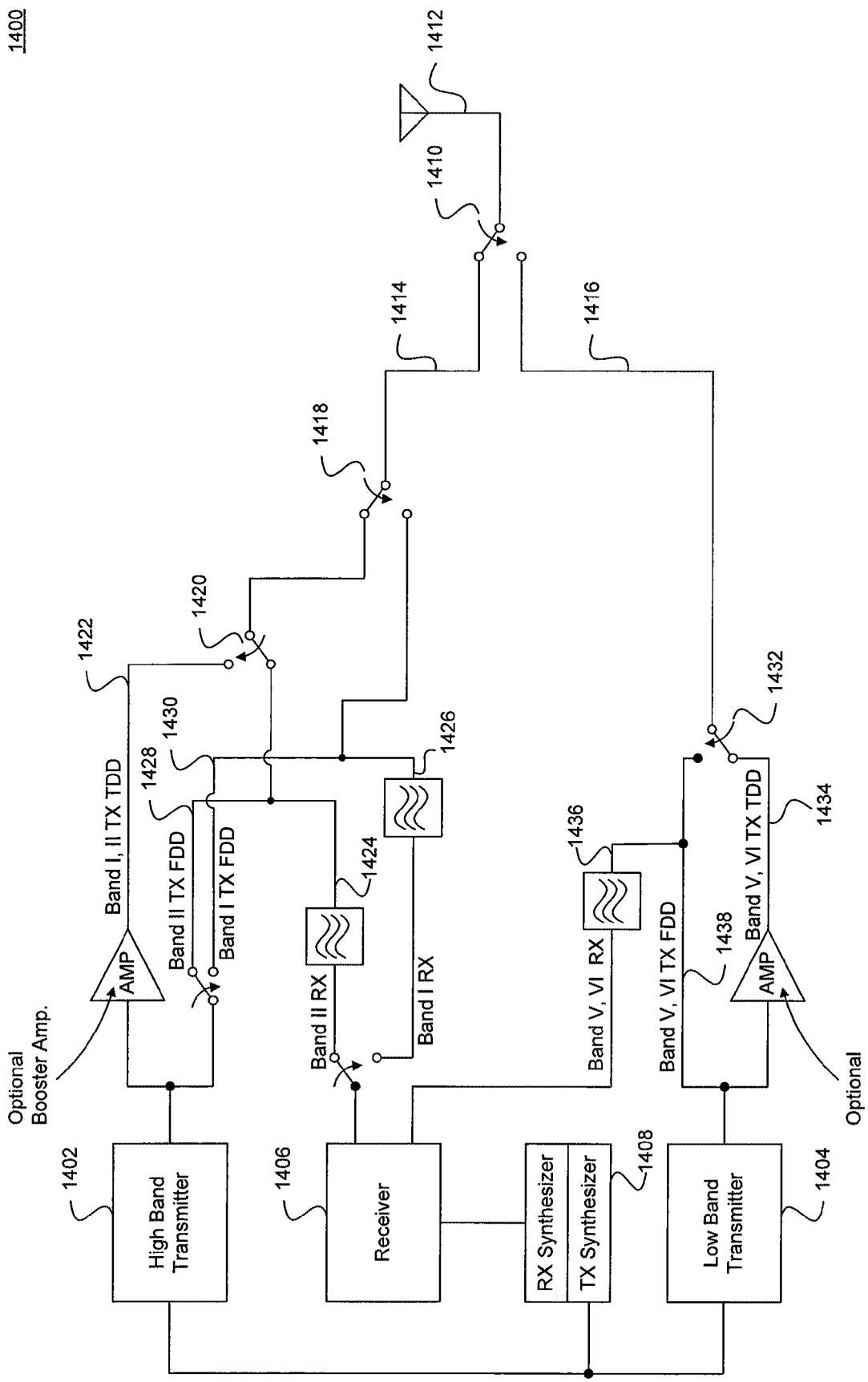

FIG. 14 illustrates an example transceiver architecture according to an embodiment of the present invention.

Figure 15:
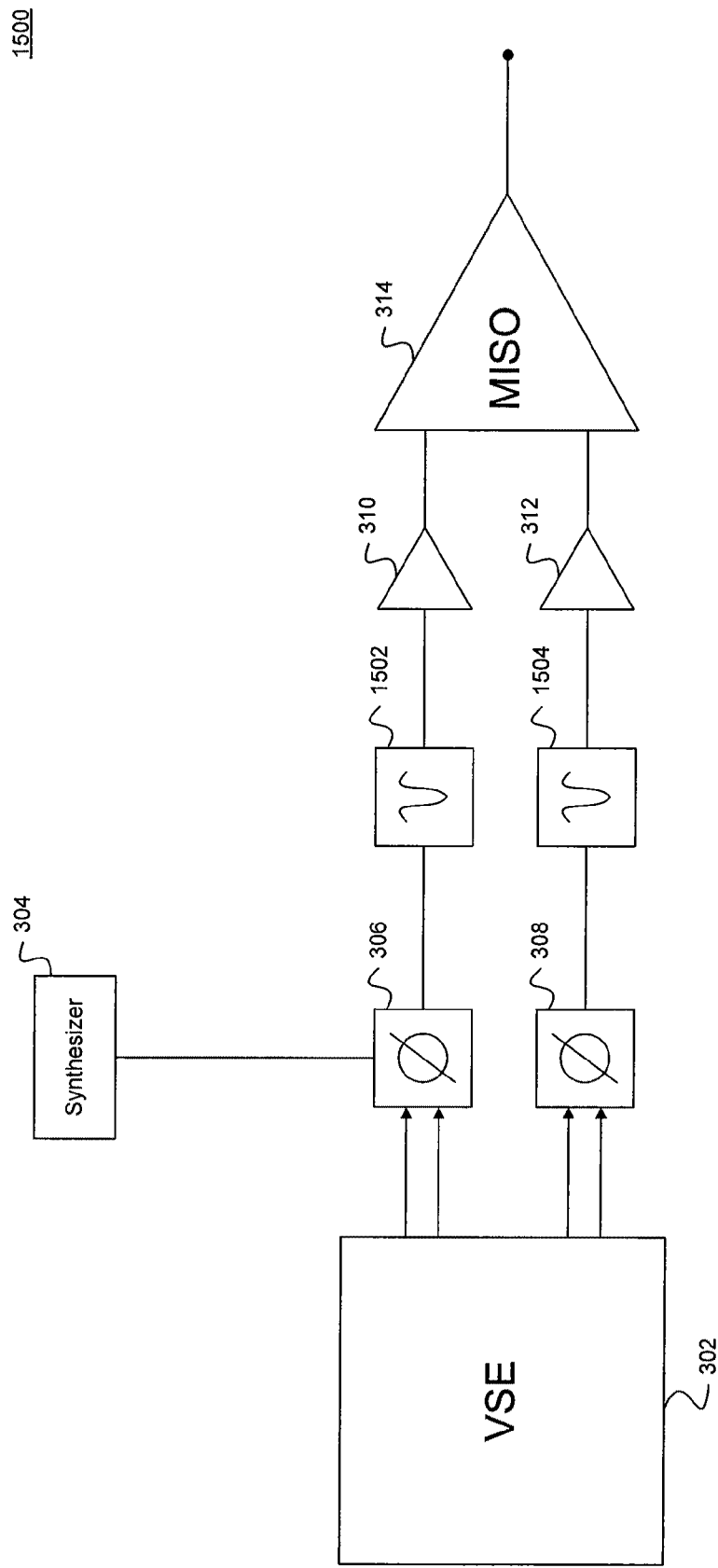

FIG. 15 illustrates an example VPA transmitter according to an embodiment of the present invention.

Figure 16:
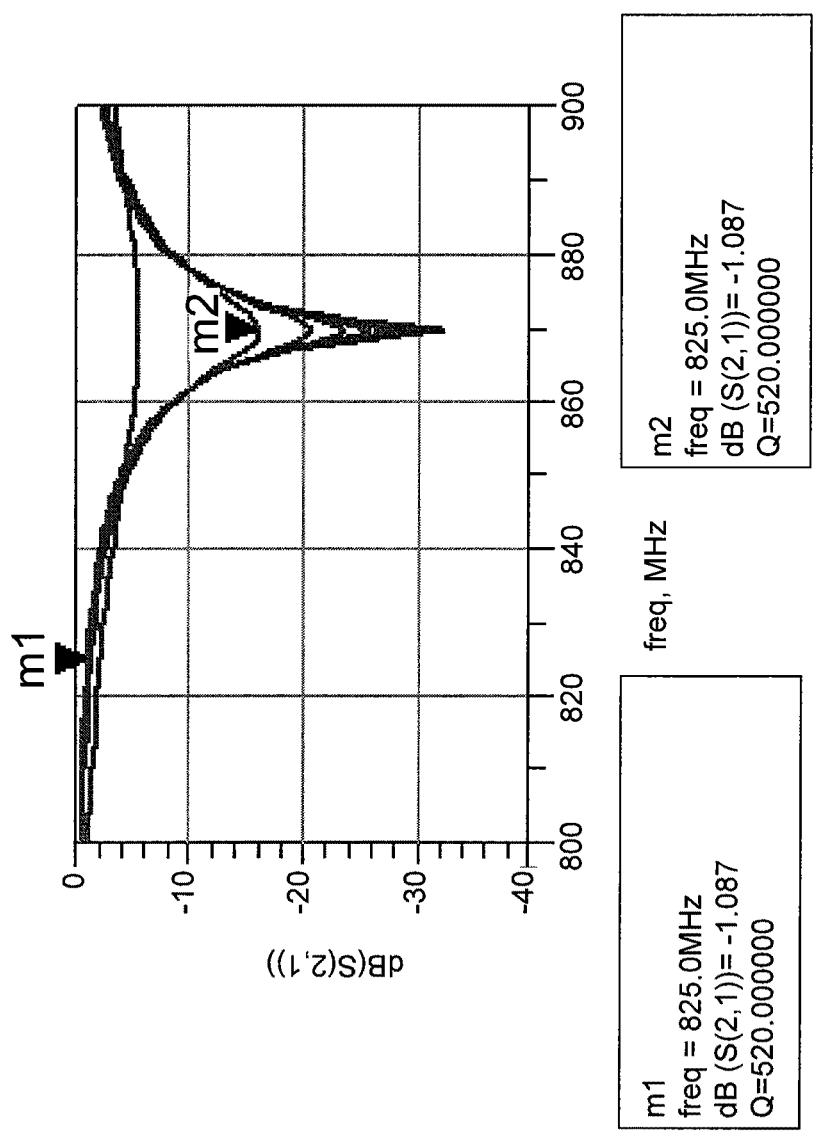

FIG. 16 illustrates an example notch filter response.

Figure 17:
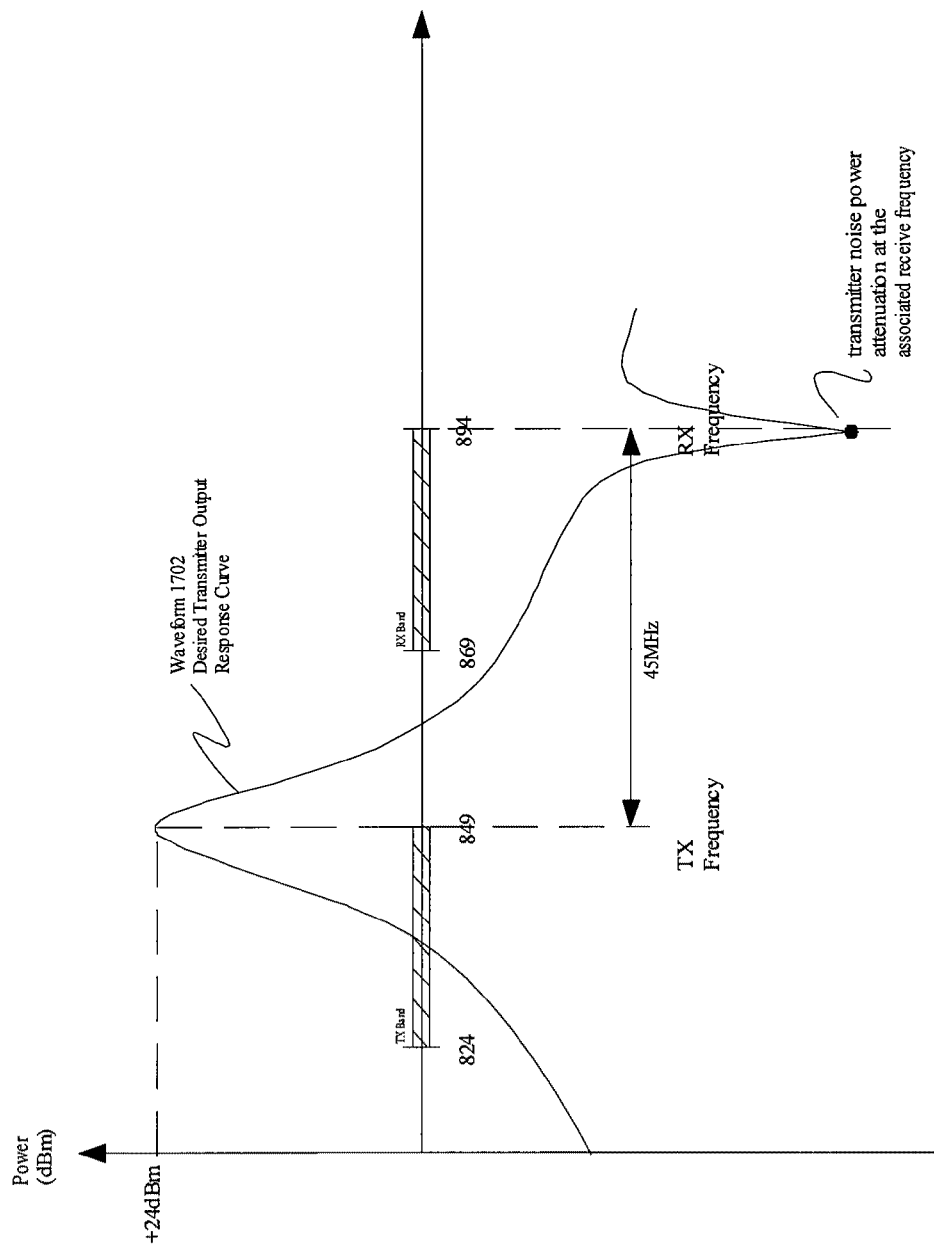

FIG. 17 provides an example output waveform according to an embodiment of the present invention.

Figure 18:
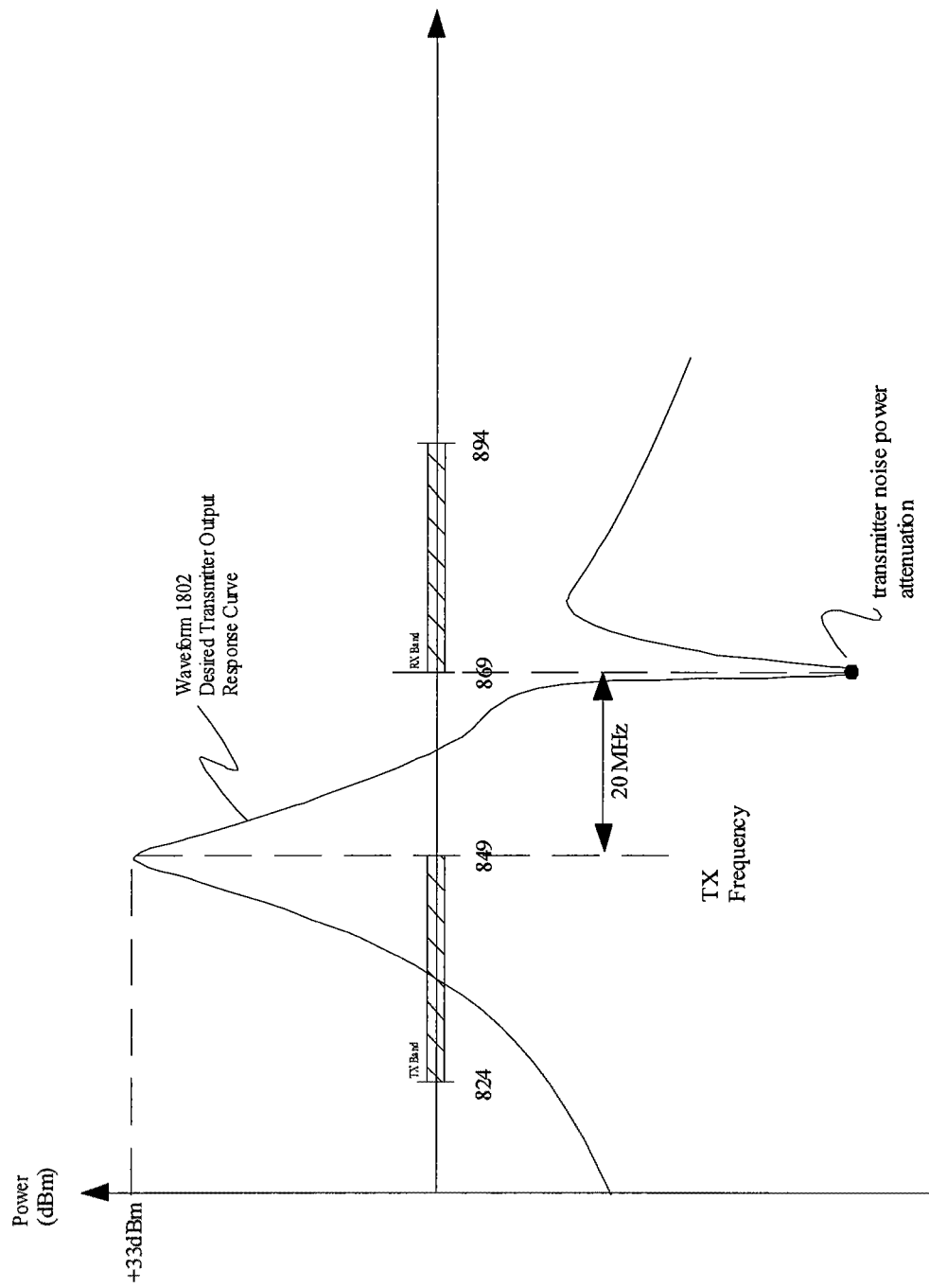

FIG. 18 provides an example output waveform according to an embodiment of the present invention.

Figure 19:
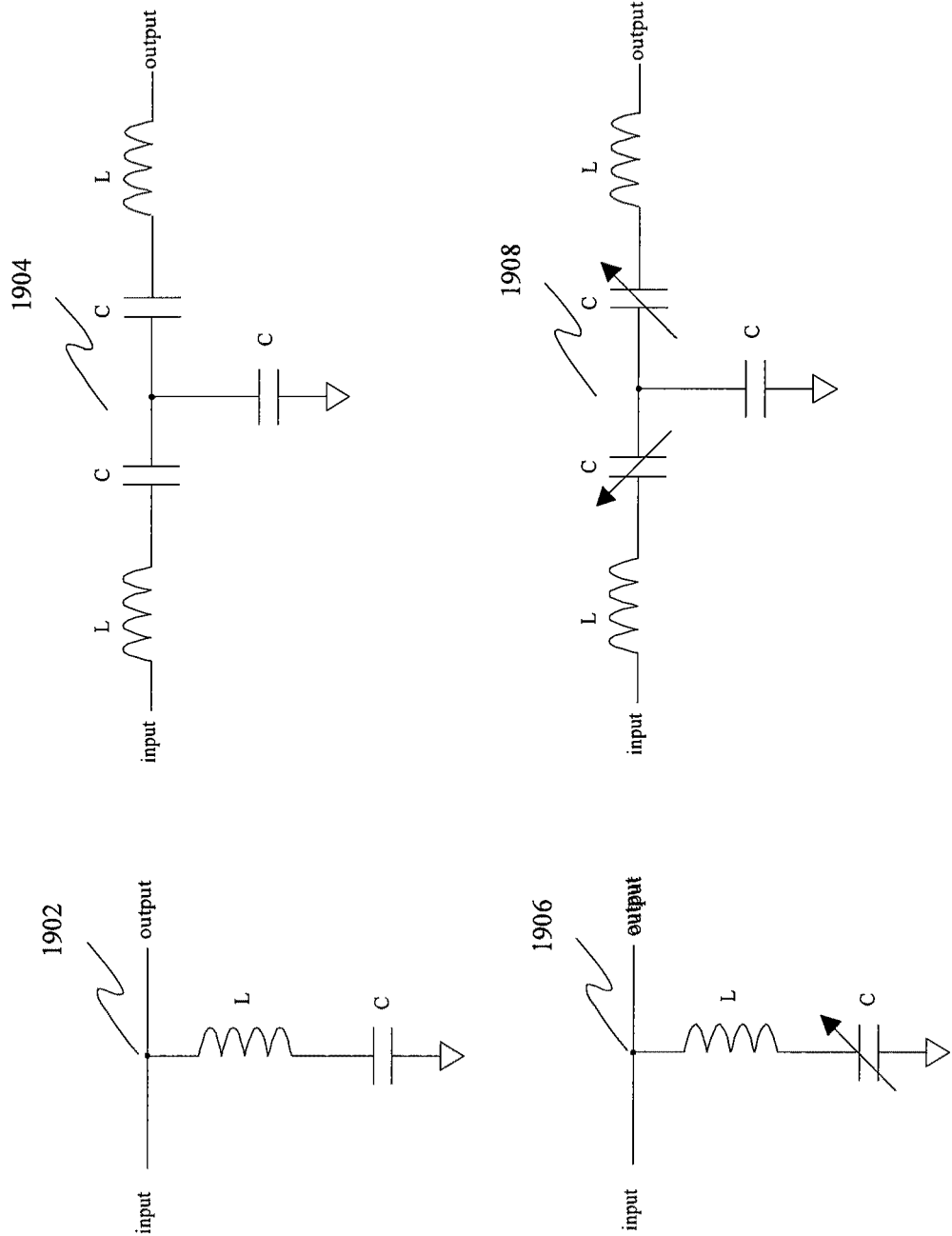

FIG. 19 illustrates exemplary notch filter designs according to embodiments of the present invention.

The present invention will be described with reference to the accompanying drawings. Generally, the drawing in which an element first appears is typically indicated by the leftmost digit(s) in the corresponding reference number.

DETAILED DESCRIPTION OF EMBODIMENT(S)

1. Introduction

In commonly owned U.S. patent(s) and application(s), cross-referenced above, VPA (Vector Power Amplification) and MISO (Multiple-Input-Single-Output) amplification embodiments were introduced. VPA and MISO provide RF power amplification that results in high power amplifier efficiency. In particular, the above cross-referenced patent(s) and application(s) provide several VPA architectures capable of concurrently supporting multiple frequency bands and/or technology modes for data transmission. In embodiments, the VPA architectures provided allow for the use of a single power amplifier (PA) branch for supporting both TDD (Time Division Duplex) and FDD (Frequency Division Duplex) based communication standards.

As would be appreciated by a person skilled in the art, VPA embodiments can be readily integrated in a transceiver architecture, to provide the transmitter section of such a transceiver architecture. As a result, the transmitter section can be optimized according to various performance parameters, including linearity, power efficiency, and power control, as described in the above noted U.S. patent(s) and application(s). In addition, as will be shown in the present disclosure, by integrating a VPA within a transceiver architecture, certain conventional elements of transceivers can be eliminated, reducing the design complexity, cost, size and power loss (increased efficiency) of the overall architecture.

2. Phase Noise and Compliant Waveform Generation

Figure 1A:
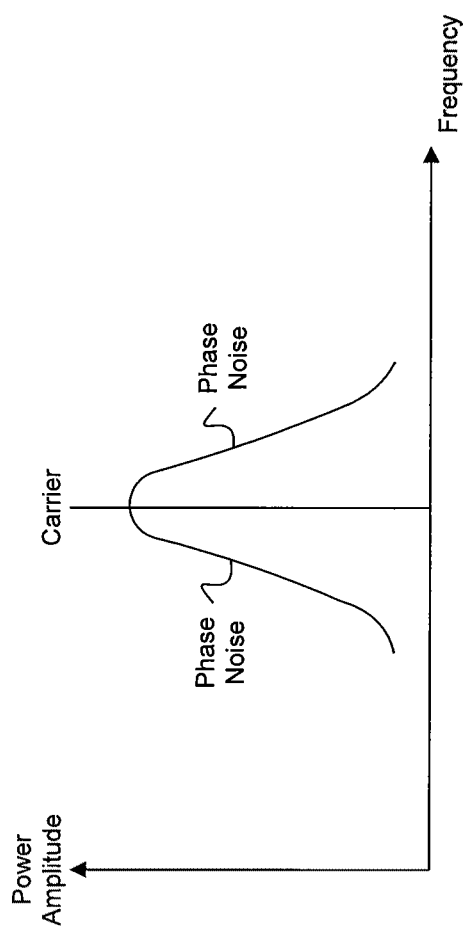
FIG. 1A is an example illustration of phase noise on a signal.
Figure 1B:
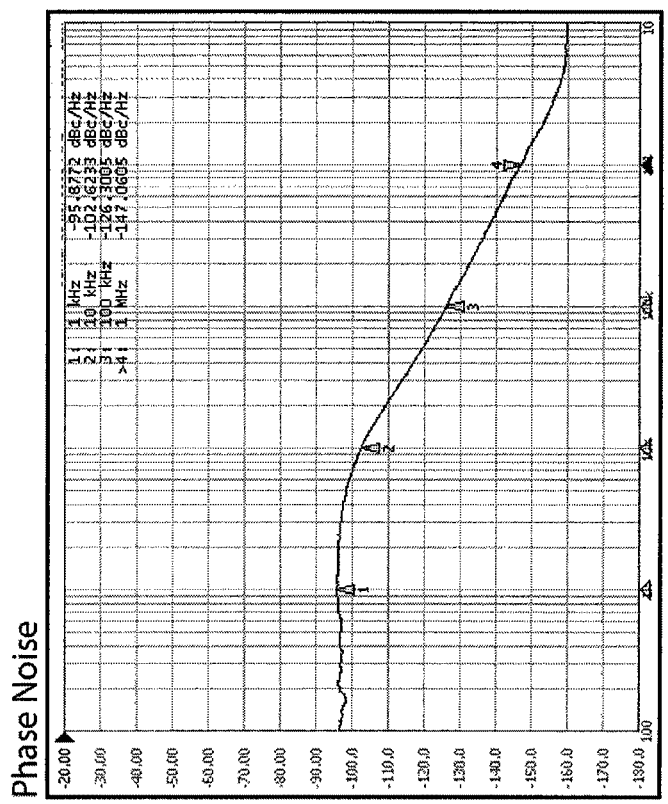
FIG. 1B is an example illustration of phase noise on a signal.

Ideally, in synthesizing a desired signal, all of the generated power will be entirely located at the carrier frequency of the signal. In practice, however, the situation is quite different. In fact, the generated power will be spread around the carrier frequency, forming a power spectral density curve. In general, this behavior, known as phase noise, is caused by small phase (and hence frequency) perturbations on the signal manifesting themselves as noise spreading on either side of the carrier frequency of the signal. FIG. 1A is an example illustration of phase noise on a signal. As shown in FIG. 1A, the signal power is spread in the form of carrier power at the carrier frequency and phase noise power on either side of the carrier frequency.

One of the main causes of phase noise is the inability of signal sources (e.g., oscillators, frequency synthesizers, etc.) to maintain the same frequency over an extended period of time in synthesizing a signal. Naturally, signal sources vary with respect to phase noise performance. However, as would be expected, signal sources with high phase noise performance come at equally high cost, making them incompatible with the design goal of low production costs of most transmitters/receivers.

Generally, the phase noise performance of a signal source is specified in units of dBc/Hz as shown in FIG. 11B. The term dBc simply refers to the level of noise relative to carrier. For example, −10 dBc means that the level is 10 dB lower than the level at the carrier. Equivalently, the phase noise performance can be specified in absolute units of dBm/Hz. Further, the phase noise performance is specified at a given offset from the carrier. This is because the level of phase noise varies as different offsets from the carrier frequency are taken.

In the context of transmitter design, phase noise affects directly the quality of waveforms generated by a transmitter as well as the total frequency response of the transmitter. Phase noise extends a portion of the transmitted signal power according to the phase noise curve beyond the desired transmitted waveform. This extension of the desired transmitted frequency due to practical frequency generation circuitry such as a frequency synthesizer can affect adjacent transmit channels and nearby receiver channels. A practical example of this principle is shown in FIG. 2 which graphically illustrates part of the GSM standard requirements where the transmitter is transmitting on the highest channel frequency allowed, 849 MHz. A nearby receiver operating on the lowest allowed receive frequency of 869 MHz, may experience a loss of sensitivity due to the transmitter signal present in the receive channel.

Figure 2A:
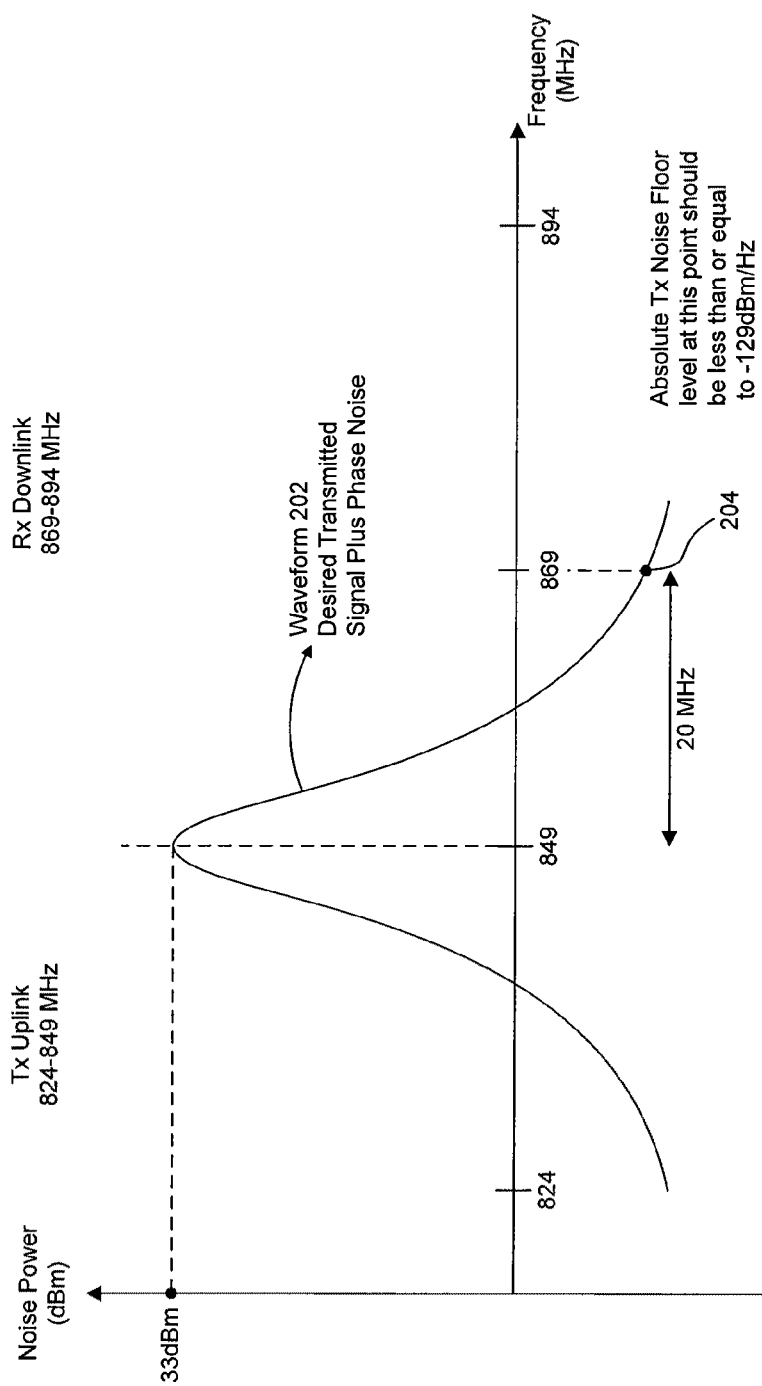
FIG. 2A illustrates an example noise floor requirement of a TDD application.

For further clarification, FIG. 2A illustrates an example specification requirement of a communication application. In particular, FIG. 2A illustrates an absolute TX noise floor level requirement in a TDD application. For illustration only, the application is assumed to be a GSM application in the GSM 850 frequency band. Accordingly, the TX uplink band corresponds to the 824-849 MHz band, and the RX downlink band corresponds to the 869-894 MHz band. The RX-TX frequency separation is equal to 45 MHz, and the minimum uplink-downlink band separation is 20 MHz.

Waveform 202 in FIG. 2A represents the power output waveform of an example transmitter. As shown, waveform 202 has a carrier frequency centered at 849 MHz. At the carrier frequency, the waveform power is equal to +33 dBm. Outside the carrier frequency and the desired modulated waveform, the remaining signal power represents phase noise power.

As shown in FIG. 2A, the phase noise power decreases as frequency tends away from the carrier frequency. Nonetheless, phase noise power remains significant and measurable inside the receiver band (i.e., 869-894 MHz). As a result, phase noise power due to waveform 202 could cause noise interference at a nearby receiver resulting in loss of receiver sensitivity. Communication applications specify absolute TX noise floor level requirements in the receive bands which define the maximum allowable phase noise power due to a transmitted waveform per bandwidth unit that may be transmitted. In other words, the TX noise floor level requirement specifies a maximum phase noise density level allowable within the receiver band. As would be understood by a person skilled in the art, to compliantly support a communication application, a transmitter is required, among other criteria, to satisfy the absolute TX noise floor requirement specified by the communication application. In the example application illustrated in FIG. 2A, the absolute TX noise floor level requirement is equal to −129 dBm/Hz. Thus, in order for a transmitter to compliantly support a GSM waveform in the GSM 850 band, the transmitter power output waveform must have a phase noise power level of −129 dBm/Hz at a 20 MHz offset from the carrier frequency.

Figure 2B:
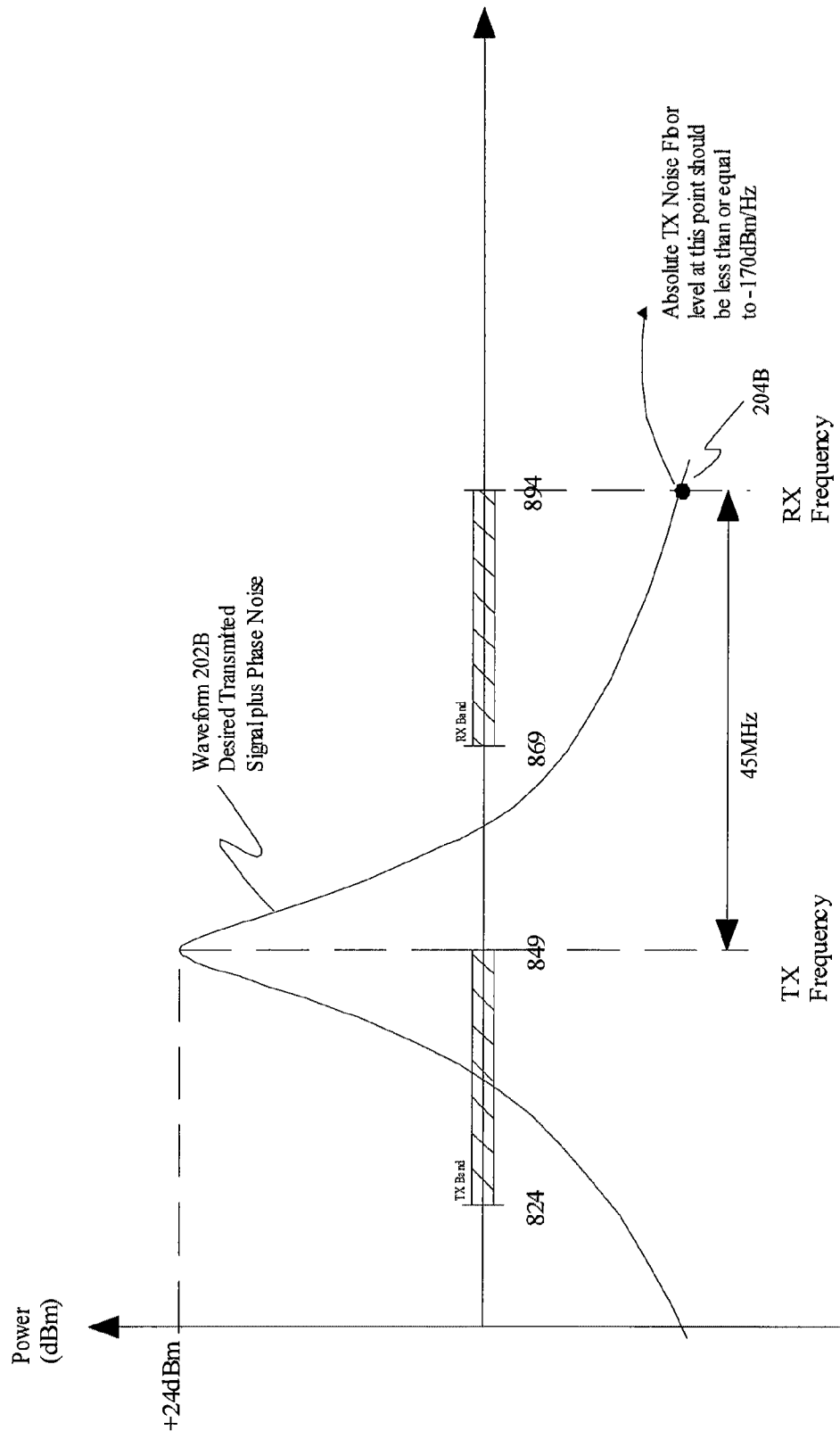
FIG. 2B illustrates an example noise floor requirement of a FDD application.

FIG. 2B is an example of a FDD application wherein the transmitter and receiver are operating simultaneously. In this example, the transmit and receive frequencies are separated by 45 MHz. In FDD designs, in order for the co-located receiver to meet its sensitivity requirements, noise from the transmitter on the receive frequency must be attenuated. In both W-CDMA and CDMA standards, it can be shown that the noise power from the transmitter must be at or below −170 dBm/Hz approximately.

Figure 3:
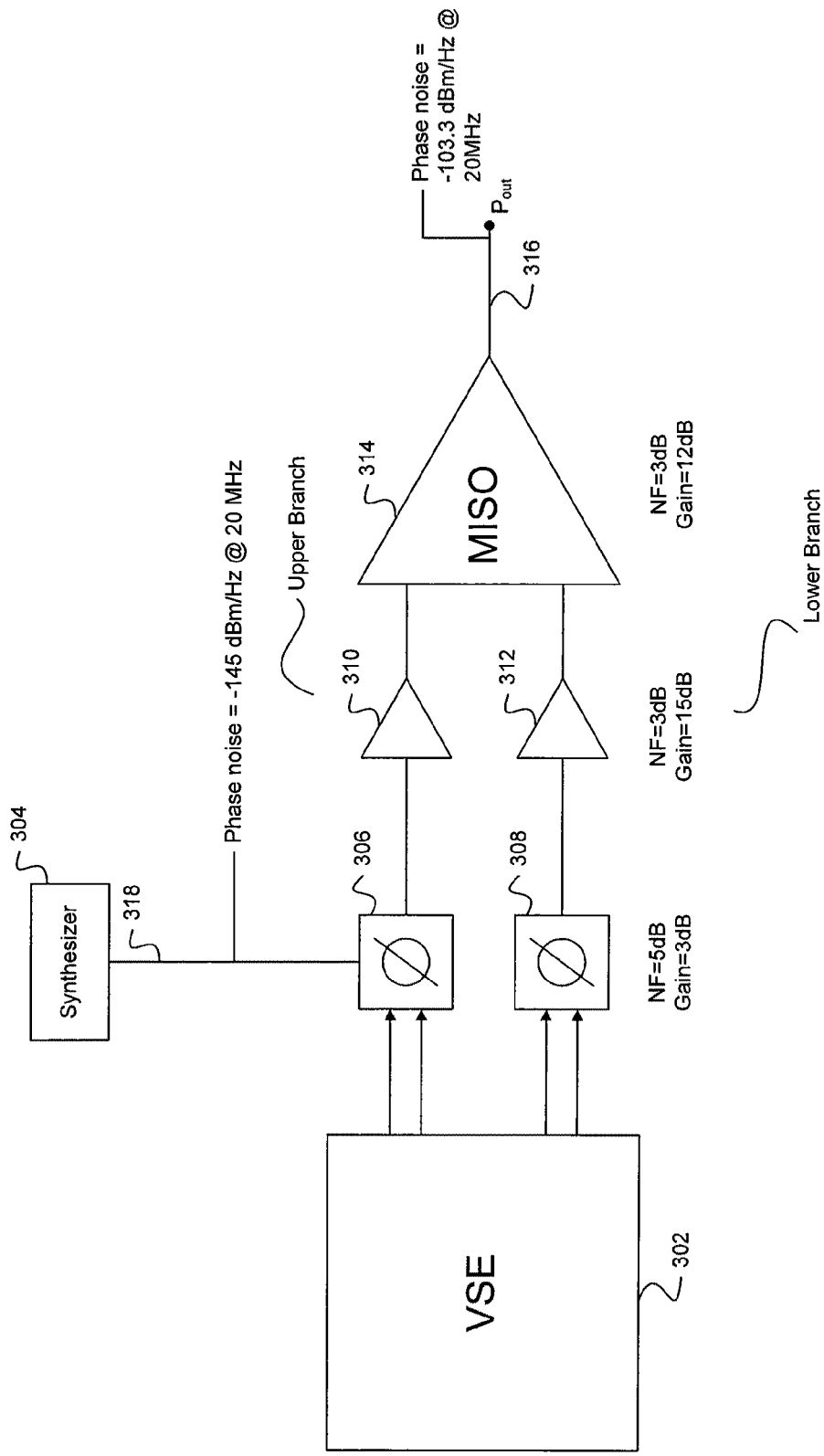
FIG. 3 is an example which illustrates the effects of phase noise on compliant waveform generation by an example transmitter.

FIG. 3 is an example which further illustrates this concept with reference to an example VPA 300. It is noted that figures used in the example of FIG. 3 are for the purpose of illustration only and are not necessarily representative of the performance of VPA elements or components. Further, it is noted that example VPA 300 is purposely simplified by omitting certain components in order to illustrate the problem created by phase noise.

As shown in FIG. 3, example VPA 300 includes a Virtual Synthesis Engine (VSE) 302, VPA circuitry, and synthesizer circuitry. This illustration includes a frequency synthesizer 304, vector modulators 306 and 308, drivers 310 and 312, and a MISO amplifier 314. Further detail regarding the operation of VSE 302 and VPA circuitry can be found in the above referenced commonly owned U.S. patents and patent applications For the purpose of illustration, it is assumed that the frequency synthesizer has a phase noise performance of −145 dBm/Hz at a 20 MHz offset. Further, as shown in FIG. 3, each stage of the VPA analog core (i.e., vector modulation stage, driver stage, MISO stage) has associated with it a noise figure (NF) and a gain figure, both represented in dB units. The noise figure of a device is a measure of the degradation in the signal to noise ratio (SNR) between the input and the output of the device. Based on the example figures in FIG. 3, the total noise figure of VPA 300 is approximately 8.7 dB and the total power gain of VPA 300 is approximately 33 dB [(3 dB+15 dB)+3 dB(upper branch plus lower branch)+12 dB (MISO)=33 dB]. The phase noise power that can be expected on output 316 is −145 dBm/Hz+33 dB+8.7 dB which equals −103.3 dBm/Hz.

Referring back to the example of FIG. 2A, note that the absolute TX noise floor requirement of the GSM application required a phase noise of −129 dBm/Hz at a 20 MHz offset. Thus, VPA 300 as illustrated in the example of FIG. 3 would require gain attenuation at a 20 MHz offset in order to generate an output signal waveform compliant with the GSM application. In particular, a gain attenuation which further decreases the phase noise by −25.7 dB at a 20 MHz offset will be needed. In traditional architectures, the required additional phase noise attenuation is accomplished using a high Q fixed frequency filter such as a SAW filter. Embodiments according to the present invention for implementing such gain attenuation of the phase noise for compliant waveform generation with reduced high Q fixed frequency filtering will be provided below. Furthermore, embodiments according to the present invention for implementing such gain attenuation of the phase noise for compliant waveform generation which eliminate high Q fixed filtering will be provided below. Also, it will be shown that embodiments of the present invention will be applicable to both TDD and FDD applications that include both SAW filters and duplexers.

3. Phase Noise and TX-Rx Isolation

As described above, phase noise causes the power output of a transmitter to be spread around the carrier frequency according to the noise power spectral density. The most direct result of phase noise is noise interference caused by the transmitter output and observed at nearby receiver bands. In FDD-based applications, the transmitter and the receiver in a transceiver unit operate simultaneously to transmit and receive signals in respective separate frequency bands. Accordingly, the phase noise due to a transmitter power output may cause noise interference at a co-located receiver. In TDD-based applications, the transmitter and the receiver in a transceiver unit operate at different time intervals to transmit and receive signals. Thus, a transmitter does not cause noise interference at a co-located receiver, if any; however, the transmitter may still cause noise interference at receivers operating at nearby bands and located in nearby or adjacent receiver/transceiver units.

As a result, isolation will be needed between a transmitter and a receiver most directly subject to noise interference from the transmitter. Further, as will be described below, this isolation can be achieved using different techniques and can be generated at different locations in the communication path between the transmitter and the receiver. For example, the isolation may be implemented at the transmitter, at the receiver, or both. In addition, as will be described below, the level of isolation needed depends in part on the communication application used. In the following discussion, the isolation between the transmitter and the receiver will be referred to as TX-RX isolation.

4. TX-RX Isolation and TX-RX Frequency Separation

Another factor which affects the required TX-RX isolation is the required frequency separation between the transmit frequency and the receive frequency, between which noise interference due to phase noise is a primary concern. This frequency separation is hereinafter referred to as the TX-RX frequency separation, and is determined differently depending on whether the application is TDD-based or FDD-based. In TDD-based applications, the TX-RX frequency separation refers to the difference in frequency between the maximum frequency of the transmit band and the minimum frequency of the receive band. This is because in TDD noise interference due to phase noise is a primary concern between a transmitter transmitting at the maximum frequency of the transmit band and an adjacent receiver receiving at the minimum frequency of the receive band. In FDD-based applications, the TX-RX frequency separation refers to the difference in frequency between a transmit frequency in the transmit band and its corresponding receive frequency in the receive band. This is because in FDD-based applications noise interference due to phase noise is a primary concern between a transmitter and a co-located receiver.

Accordingly, the TX-RX frequency separation depends on the communication application used (which determines whether the application is TDD-based or FDD-based and the operating frequency band).

For the purpose of illustration, FIGS. 4-6 illustrate frequency allocations for various frequency bands associated with different mobile communication standards. For example, FIG. 4 shows the frequency allocation for bands 1-5 and 8 of the Evolved UMTS Terrestrial Radio Access (E-UTRA) mobile communication standard (an FDD standard). As shown in FIG. 4, the TX-RX frequency separation varies according to which band of E-UTRA band is used, and ranges from 45 MHz for bands 5 and 8 up to 400 MHz for band 4. FIG. 5 shows the frequency allocation for various GSM bands (GSM is a TDD standard). FIG. 6 shows the frequency allocation for band class 0 of the CDMA2000 mobile communication standard (CDMA2000 is an FDD standard).

As can be noted from FIGS. 4-6, the TX-RX frequency separation is generally much higher for FDD-based standards than for TDD-based standards. This is because, as noted above, in TDD-based standards the TX-RX frequency separation is mandated to reduce interference between transmitter(s) and receiver(s) of nearby and adjacent mobile units, while, on the other hand, in FDD-based standards, the TX-RX frequency separation is required to reduce interference between co-located transmitter(s) and receiver(s).

5. TX-RX Isolation Requirements for Enabling Worlwide Operable Transceiver

A main objective in the design of high-speed mobile communication transceivers is to enable the transceiver to support as many communication applications as possible, which allows the transceiver to operate over as many major networks worldwide as possible. However, as TX-RX isolation requirements vary from one communication application to another, enabling a worldwide operable transceiver requires meeting the TX-RX isolation requirement of each of the supported communication applications. In the following, an example is provided to illustrate the isolation design requirements of a transceiver worldwide operable with both 3GPP and 3GPP2 systems. In particular, the transceiver enables communication applications using, among others, WCDMA, GSM, EDGE, HSPA, and CDMA2000.

One design choice involves selecting the operating frequency bands to support by the transceiver. Two criteria govern this selection: 1) selecting bands over which the above noted communication standards can be enabled; and 2) selecting bands having on the aggregate worldwide approved geographical use.

FIG. 7 illustrates the operating frequency bands for the FDD-mode of UMTS (Universal Mobile Telecommunications System) as well as the primary approved locations and communication standards supported in each band. According to an example embodiment of the present invention (for enabling a HEDGE transceiver), bands I, II, V, and VI of the FDD-UMTS bands are selected for support by the transceiver. As such, nearly worldwide operability can be enabled. Indeed, as shown in FIG. 7, by supporting bands I, II, V, and VI, HSUPA, WCDMA, GSM, and EDGE can be supported over both a low band and a high band in North America and South America. HSUPA, WCDMA, GSM, and EDGE can be supported over a low band in Asia, Australia, and Japan. Further, HSUPA and WCDMA can be supported over a high band in Europe and Asia.

The minimum required TX-RX frequency separations associated with the selected bands drive the TX-RX isolation requirements of the transceiver. For example, from FIG. 7, it can be noted that the minimum frequency separation for FDD waveforms and TDD waveforms can be written as follows:

45 MHz TX-RX for FDD low band applications (i.e., 824 MHz to 894 MHz)

80 MHz TX_RX for FDD high band applications (i.e., 1850 MHz to 2170 MHz).

20 MHz band separation for GSM and EDGE TDD low band and high band applications.

At each of these frequency offsets, the TX-RX isolation performance must meet minimum standards in order for the transceiver to function properly. In other words, the isolation performance must satisfy the FDD TX-RX noise floor level requirements of both HSPA and W-CDMA, measured at a 45 MHz frequency offset at a co-located receiver in the selected low bands and 80 MHz frequency offset at a co-located receiver in the selected high bands. Further, the isolation performance must satisfy the TX-RX noise floor level requirements of both GSM and EDGE measured at a 20 MHz offset.

6. Conventional Transceiver Architectures

Figure 8:
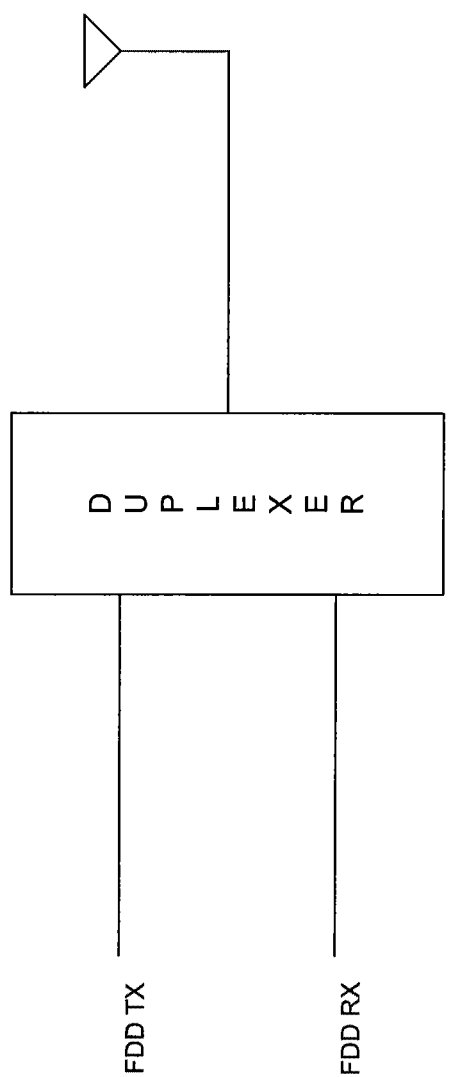
FIG. 8 illustrates a typical FDD section of a conventional transceiver architecture.

Conventional industry approaches for satisfying isolation performance employ fixed frequency filters to isolate the bands of interest and achieve the required TX-RX noise floor levels. Typically, these filters are band-pass filters constructed from SAW, BAW, or DR resonators. For example, commonly, TX-RX isolation for FDD-based communication applications is achieved by means of a duplexer, coupled between the transmit/receive chain and the antenna of the transceiver, as illustrated in FIG. 8, for example. In practice, a duplexer is equivalent to two very high Q fixed frequency filters; one for the transmit chain and one for the receive chain of the transceiver.

For TDD-based communication applications, TX-RX isolation is typically achieved by means of high Q fixed frequency-band-pass filters such as SAW filters in the transmit chain of the transceiver.

Figure 9:
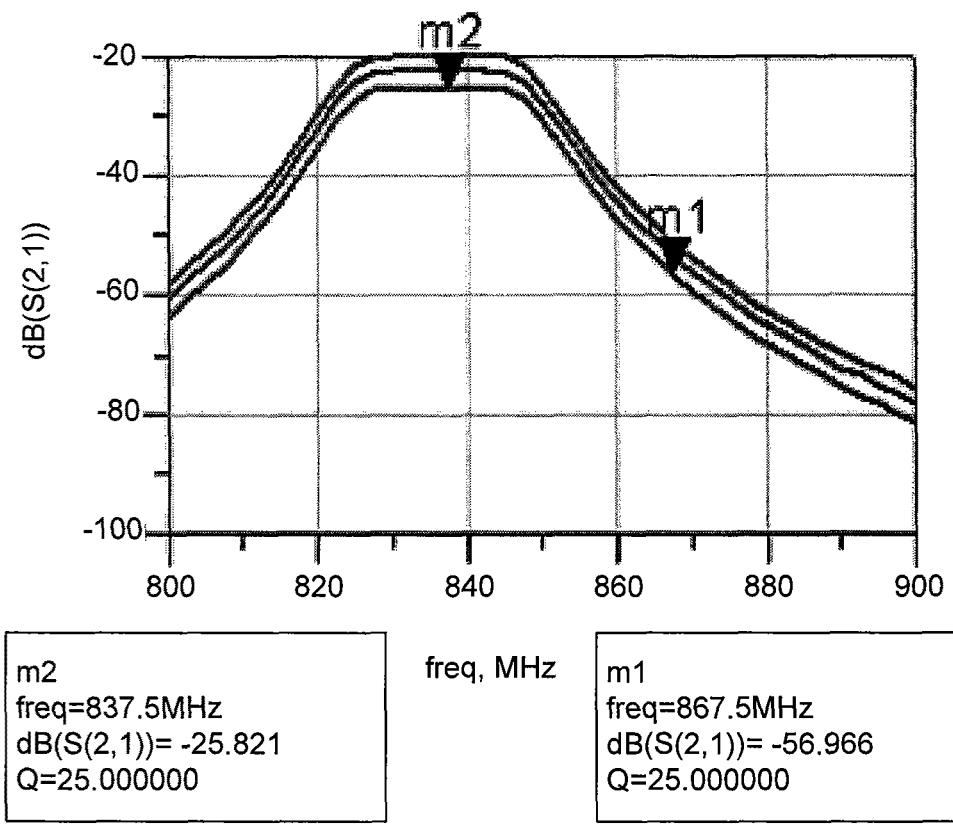
FIG. 9 illustrates an example band-pass filter response.

FIG. 9 illustrates an example filter response of a band-pass filter for a fixed FDD application in band 5. Similar band-pass filters are generally used in conventional transceiver architectures, as described above. However, the band-pass filter response attenuates out of band frequencies (high Q) rapidly. For example, as shown in FIG. 5, the dB attenuation is approximately −37 dB at 867.5 MHz.

What is particularly relevant, however, for achieving TX noise floor requirements is the power attenuation at the minimum TX-RX frequency separation for the frequency range and waveform of interest. This, as noted above, varies according to the communication application used. For example, as shown in FIG. 3, for a fixed FDD application in band 5, the minimum TX-RX frequency separation is 45 MHz. Thus, in order to satisfy TX noise floor requirements for an FDD application in band 5, the band-pass filter illustrated in FIG. 9 will need to provide sufficient attenuation at a 45 MHz offset from the carrier frequency so as to allow the co located receiver to meet its specified sensitivity. It is important to note that in conventional architectures, each band that supports FDD operation of the transceiver requires a filter which is typically a duplexer. Using the design example above, to support the three (3) bands that require HSPA and W-CDMA would require three (3) duplexers.

However, as noted above, when more stringent TX noise floor requirements are demanded, the design complexity of band-pass filters that meet such requirements becomes increasingly more difficult. What is done generally to overcome this problem is to construct the desired filter response using multiple filters located at various points within the transmit/receive chain. However, while this lessens the design complexity of the filters, the cost and size associated with such a solution cannot be neglected.

For the purpose of illustration, FIG. 10 shows a conventional UMTS transceiver architecture 1000. As shown in FIG. 10, transceiver 1000 includes a first section 1002 for enabling FDD-based communication applications (e.g., WCDMA) and a second section 1004 for enabling TDD-based communication applications (e.g., GSM, DCS/PCS). Further, transceiver 1000 includes a mode switch 1006, which allows for coupling the appropriate section of the transceiver to an antenna depending on the selected communication standard.

As shown in FIG. 10, each section of transceiver 1000 includes a transmit chain and a receive chain. The transmit chain generally includes a digital portion followed by an analog portion. For example, in section 1002, the transmit chain includes a digital portion comprising a digital section, a digital filter, and a DAC, followed by an analog portion comprising I/Q filters, I/Q modulators, and a power amplifier (PA).

In addition, the transmit chain may include frequency band filters, for configuring/shaping the transmit signal according to the selected frequency band requirements. For example, in section 1002, multi-band filters 1012 are used in order to accommodate various frequency bands of the W-CDMA communication standard. Similarly, in section 1004, filters 1014 and 1016 are used to satisfy GSM and DCS/PCS requirements.

As noted above, filters such as filters 1012, 1014, and 1016 are conventionally used in transceivers to achieve, among other things, the desired TX-RX isolation requirements. However, as TX-RX isolation requirements increase (e.g., 45-50 dB), the design complexity of such filters increases. This is especially the case in designing band-pass filters for FDD-based communication applications, for which higher TX-RX isolation requirements are generally required than for TDD-based applications.

As shown in FIG. 10, transceiver architecture 1000 also uses three duplexers 1008 in FDD section 1002. As noted above, a duplexer is a common solution used in conventional architectures in order to provide the required isolation between the FDD transmit and receive chains of the transceiver. Such a solution, however, has several drawbacks. For example, because a duplexer is not a tunable device and thus a duplexer is required for each band of FDD operation. In practice a duplexer solution will require two different inputs/outputs in the transceiver architecture, one for the FDD section and one for the TDD section. Another disadvantage of a duplexer solution relates to the power loss that results from the duplexer. Indeed, with a power loss of approximately 1.5 dB to 4 dB, a duplexer solution would require higher power output from the transmitter, resulting in increased power consumption.

7. Transceiver Architectures Preferred Embodiments

Embodiments of the present invention provide transceiver architecture solutions for worldwide operable transceivers that do not require fixed frequency high Q filters such as duplexers and SAW filters. As a result, transceiver architectures according to embodiments of the present invention can be designed to have a single input/output for both FDD and TDD-based standards. Further, because the duplexer power loss is removed, power output requirements can be met more easily with transceiver architectures according to embodiments of the present invention. Further still, according to embodiments, the transmitter chain can be connected directly to the antenna, without any intervening elements.

Further, according to embodiments of the present invention, fixed frequency high Q band pass filters that are generally used in conventional architectures can be eliminated. As a result, the design complexity and cost of embodiments of the present invention are significantly reduced compared to conventional architectures.

According to embodiments of the present invention, TX noise floor requirements can be met with a tunable filter design that enables true frequency agility and reduces complexity and cost. Further, according to embodiments, this can be achieved by shaping the transmit waveform, without applying any modifications to the receive chain(s) of the transceiver.

Embodiments of the present invention recognize the need to achieve TX noise floor requirements at specific frequency offsets from the transmit channel frequency range. As a result, a band-pass filter solution as described above can be replaced with a solution that only targets those frequency ranges for which TX noise floor requirements exist. This type of localized solution, as will be further described below, is not only simpler to design and less expensive (in terms of actual cost and circuit real estate) than conventional solutions but also comes with significant gains in terms of lower power loss and consumption in the overall transceiver.

According to embodiments, a localized solution as described above can be realized using notch filter(s) and/or band reject filter(s). Indeed, notch and/or band reject filters according to embodiments of the present invention can be designed to efficiently remove energy at specified frequencies so as to meet TX noise floor requirements. Further, notch and/or band reject filters according to embodiments of the present invention can be designed to be configurable according to the requirements of the communication application used.

FIG. 11 is a block diagram that illustrates an example FDD section architecture 1100A according to an embodiment of the present invention. As shown in FIG. 11, unlike conventional transceiver architectures, architecture 1100 does not use any duplexers between transmitter 1102A, receiver 1104A, and antenna 1106A. Instead, transmitter 1102A is directly coupled to antenna 1106A.

In an embodiment, transmitter 1102A includes a VPA having TX-RX filter solutions according to embodiments of the present invention. In particular, transmitter 1102A provides the required TX-RX isolation for FDD-based applications. Receiver 1104A can be a conventional receiver that meets the required receive specifications. Receiver 1104A's input is coupled to filter 1110A which provides the interface between receiver 1104A, transmitter 1102A, and antenna 1106A. Filter 1110A is designed such that the filter input impedance is optimal in the receiver frequency band and sub-optimal in the transmitter frequency band. For example, in a FDD application in band 5, receiver 1104 may have an impedance greater than 500 Ohms at a transmit frequency of 824 MHz and an impedance of 50 Ohms at a receive frequency of 869 MHz.

FIG. 12 is a block diagram that illustrates an example TDD section architecture 1200 according to an embodiment of the present invention. As shown in FIG. 12, architecture 1200 uses a T/R switch 1208 to alternately couple transmitter 1202 and receiver 1204 to antenna 1206. In an embodiment, transmitter 1202 includes a VPA having TX-RX isolation solutions according to embodiments of the present invention that meets or exceed the required RX band noise performance. Receiver 1204 can be a conventional receiver that meets the required receive specifications.

FIG. 13 is a block diagram that illustrates an example transceiver architecture 1300 according to an embodiment of the present invention. Architecture 1300 may represent, for example, the low band or the high band section of a multiband transceiver architecture according to an embodiment of the present invention.

As shown in FIG. 13, transceiver architecture 1300 includes a transmitter section and a receiver section. The transmitter section includes a transmitter 1302, which in an embodiment includes a VPA having TX-RX isolation solutions according to embodiments of the present invention. Transmitter 1302 can be coupled to antenna 1308 via a TDD TX branch 1316 or an FDD TX branch 1318 according to the communication application used. In an embodiment, TDD TX branch 1316 may include one or more amplifiers 1314, as shown in FIG. 13. In an embodiment, a switch 1310 operates to couple TDD TX branch 1316 or FDD TX branch 1318 to antenna 1308. Further, switch 1310 works as a T/R switch between the transmitter and receiver sections when the transceiver is operated according to a TDD communication application.

In an FDD application, switch 1310 remains coupled to node 1322 shown in FIG. 13. Thus, switch 1310 couples antenna 1308 simultaneously to FDD TX branch 1318 and FDD/TDD RX branch 1320. It is noted that FDD TX branch 1318 and FDD/TDD RX branch 1320 are directly coupled antenna 1308, with no intervening duplexer elements.

The receiver section of transceiver architecture 1300 includes a receiver 1304. Receiver 1304 can be a conventional receiver that meets the required receive specifications. Receiver 1304 is coupled to antenna 1308 via FDD/TDD RX branch 1320. In an embodiment branch 1320 includes a filter 1312, which operates similarly to filter 1110A by providing an optimal receiver input impedance in the receive frequency band and a sub-optimal receiver input impedance in the transmit frequency band. Transceiver architecture 1300 also includes a frequency synthesizer 1306, including a RX synthesizer and a TX synthesizer. Frequency synthesizer 1306 provides transmitter 1302 and receiver 1306 with signals for signal generation and demodulation, respectively.

FIG. 14 is a block diagram that illustrates an example transceiver architecture 1400 according to an embodiment of the present invention. Architecture 1400 may represent, for example, a multi-band transceiver architecture according to an embodiment of the present invention.

For the purpose of illustration, it is assumed that transceiver architecture 1400 supports bands I, II, V, and VI of the FDD-UMTS spectrum. However, it is noted that transceiver architectures according to embodiments of the present invention are not limited to the example implementation illustrated by architecture 1400. For example, transceiver architectures according to embodiments of the present may be implemented to support any combination of bands of the FDD-UMTS spectrum.

As shown in FIG. 14, transceiver architecture 1400 includes a high band transmitter subsystem 1402, a low band transmitter subsystem 1404, a receiver 1406, and a frequency synthesizer 1408.

Transmitter subsystems 1402 and 1404 include in an embodiment VPAs having TX-RX isolation solutions according to embodiments of the present invention. Receiver 1406 can be a conventional receiver that meets the required receive specifications.

As shown in FIG. 14, transceiver architecture 1400 includes a band switch 1410, which couples antenna 1412 to either a high band branch 1414 or a low band branch 1416 of the transceiver according to the communication application used. Alternately, switch 1410 could be replaced by two antennas, one antenna for the low band and one antenna for the high band.

High band branch 1414 includes switches 1418 and 1420. Switches 1418 and 1420 operate to couple various TX/RX branches of the transceiver to antenna 1412. For example, in a TDD Band I application, switches 1418 and 1420 act in combination as a T/R switch to alternately couple branch 1422 and branch 1426 to antenna 1412. Similarly, in a TDD Band II application, switches 1418 and 1420 act in combination as a T/R switch to alternately couple branch 1422 and branch 1424 to antenna 1412. Further, in FDD applications, switches 1418 and 1420 act to couple the respective TX and RX branches to the antenna. For example, in a Band II FDD application, switches 1418 and 1420 act to couple branches 1428 and 1426 to antenna 1412.

Low band branch 1416 includes a switch 1432, which acts as both a mode switch or a T/R. For example, in a TDD application, switch 1432 acts to alternately couple TX branch 1434 and RX branch 1436 to antenna 1412. In a FDD application, switch 1432 acts as a mode switch, coupling TX branch 1438 and RX branch 1436 to antenna 1412.

It is noted that transceiver architecture 1400 does not use any duplexer elements to couple the TX/RX branches to antenna 1412.

FIG. 15 is an example VPA transmitter 1500 according to an embodiment of the present invention. VPA transmitter 1500 can be used as transmitter 1102, 1202, 1302, 1402, and 1404 described above, for example. As shown in FIG. 15, VPA transmitter 1500 includes notch filters 1502 and 1504 located in each of its outphasing branches. Notch filters 1502 and 1504 can be fixed in frequency or tunable in frequency.

As would be understood by a person skilled in the art based on the teachings herein, notch filters can be placed at various points within VPA transmitter 1500. In an embodiment, as shown in FIG. 15, notch filters 1502 and 1504 are located at the outputs of vector modulators 306 and 308. Alternatively, notch filters 1502 and 1504 are placed at the outputs of drivers 310 and 312. In another embodiment, a notch filter is placed at the output of MISO 314. In another embodiment, one or more notch filters are used within each branch of VPA transmitter 1500 and/or at the output of MISO 314. When frequency tunable notch filters are employed, they are tuned to the same notch frequency. For example in an embodiment three frequency tunable notch filters are employed and are located at the output of driver 310, the output of driver 312 and the output of MISO 314. All three notch filters are tuned to the same notch frequency to provide the maximum attenuation at the desired frequency.

Notch filters 1502 and 1504 operate to remove energy content at specified frequencies from the output of VPA transmitter 1500, according to the communication application used. In an embodiment, notch filters 1502 and 1504 are configurable according to the communication application. In another embodiment, notch filters include tunable elements, which allow their frequency responses to be dynamically adjusted according to the required TX-RX frequency separation, isolation and/or noise floor requirements.

In an embodiment, a desired notch filter frequency response is generated as an aggregate result of multiple notch filters located at various points of the VPA transmitter. Accordingly, classical filter topologies as well as multiple staggered topologies can be used according to embodiments of the present invention.

According to an embodiment, notch filters are replaced or used in conjunction with band reject filters to provide for wider band rejection for certain applications.

FIG. 16 illustrates an example notch filter frequency response. Generally, the depth (attenuation) and the width of the "notch" depend on the Q of the filter. According to embodiments of the present invention, notch filters of various depths and widths can be readily designed. Moreover, tunable notch filters can be designed according to embodiments of the present invention.

FIG. 17 provides an example output waveform 1702 according to an embodiment of the present invention. In this FDD example the notch filters are tuned to accommodate a 45 MHz frequency offset between the transmit and receive frequencies. The maximum attenuation of the transmitted signal occurs at the center frequency of the notch filter(s). In the case of FDD waveforms, each time the transmit frequency changes, the notch filter(s) are tuned to maintain the required 45 MHz frequency offset. In this manner, the minimum transmitter noise always corresponds to the desired receive frequency.

FIG. 18 provides an example output waveform 1802 according to an embodiment of the present invention. In this TDD example the notch filters can have either a fixed center frequency or a tunable center frequency and the maximum attenuation of the transmitted signal occurs at the first receive frequency in the receive band. It should be apparent that by using a tunable notch filter design, both FDD and TDD standards can be accommodated using a single design and a single design with a single output can support multiple frequency bands.

Notch filter and band reject filter design and implementation are well known in the art of electronics and can be designed in various ways using multiple topologies. FIG. 19 shows exemplary notch filter designs according to embodiments of the present invention. Notch filters 1902 and 1904 are fixed frequency designs, and notch filters 1906 and 1908 are variable frequency (tunable) designs.

As has been shown in certain preferred embodiments high Q fixed frequency filters such as duplexers and SAWs can be eliminated. In other embodiments, the requirements of the high Q fixed frequency filters may be relaxed or reduced. The reduced filter requirements enable smaller filter sizes and lower costs.

8. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, in a transceiver, for reducing noise in a receive channel caused by a transmit channel, comprising:
   determining a transmit frequency of the transceiver and a receive frequency of the transceiver;
   determining a noise floor requirement of the transceiver based on the transmit frequency and the receive frequency; and
   adjustably attenuating a transmit waveform, with a filter at an output of a multiple-input-single-output (MISO) device, at one or more frequencies within a receive band of frequencies associated with the receive frequency such that the noise floor requirement is satisfied at the receive frequency, wherein the adjustably attenuating comprises filtering at least one input to the MISO device and the output of the MISO device at substantially the same notch filter frequency.

2. The method of claim 1, wherein the adjustably attenuating the transmit waveform comprises using a notch filter at the output of the MISO device to attenuate the transmit waveform at the receive frequency.

3. The method of claim 2, wherein the using the notch filter to attenuate the transmit waveform comprises using a tunable center-frequency notch filter to attenuate the transmit waveform at the receive frequency.

4. The method of claim 1, wherein the adjustably attenuating the transmit waveform comprises using a band-reject filter at the output of the MISO device to attenuate the transmit waveform at the receive frequency.

5. The method of claim 1, wherein the adjustably attenuating further comprises:
   filtering at least one of an upper branch of frequencies associated with the transmit waveform at a first input to the MISO device, a lower branch of frequencies associated with the transmit waveform at a second input to the MISO device or both.

6. The method of claim 1, wherein the adjustably attenuating further comprises:
   filtering at least one input to the MISO device such that an aggregate of the filtered signals associated with the at least one input to and the output of the MISO device provides a desired notch filter frequency at the output of the MISO device.

7. An apparatus for reducing noise in a receive channel caused by a transmit channel, the apparatus comprising:
   a transceiver comprising:
      a multiple-output-single-input (MISO) device, wherein the transceiver is configured to adjustably attenuate a transmit waveform, with a first filter at an output of the MISO device, at one or more frequencies within a receive band of frequencies associated with a receive frequency of the transceiver such that a noise floor requirement of the, transceiver is satisfied at the receive frequency; and
      a vector power amplification (VPA) transmitter that includes:
         a plurality of vector modulators;
         a plurality of second filters coupled to corresponding outputs of the plurality of vector modulators; and
         a plurality of drivers coupled to corresponding outputs of the plurality of second filters; and
      an antenna coupled to the transceiver and configured to transmit the transmit waveform.

8. The apparatus of claim 7, wherein the first filter comprises:
   a notch filter at the output of the MISO device configured to attenuate the transmit waveform at the receive frequency such that the noise floor requirement is satisfied at the receive frequency.

9. The apparatus of claim 8, wherein the notch filter comprises:
   a tunable center-frequency notch filter configured to attenuate the transmit waveform at the receive frequency such that the noise floor requirement is satisfied at the receive frequency.

10. The apparatus of claim 7, wherein the first filter comprises:
    a band-reject filter at the output of the MISO device configured to attenuate the transmit waveform at the receive frequency such that the noise floor requirement is satisfied at the receive frequency.

11. The apparatus of claim 7, wherein the VPA transmitter comprises at least one filter, and wherein at least one filtered output associated with the of least one filter is coupled to an input to the MISO device.

12. The apparatus of claim 7, wherein a set of filters from the plurality of second filters is coupled to inputs of the MISO device.

13. The apparatus of claim 12, wherein the plurality of second filters is tuned to substantially the same notch filter frequency to provide attenuation of the transmit waveform at the one or more frequencies within the receive band of frequencies associated with the receive frequency.

14. The apparatus of claim 12, wherein at least two filters from the plurality of second filters are tuned to the same notch filter frequency such that an aggregate of the filter outputs associated with the at least two filters provides a desired notch filter frequency at the output of the MISO device.

15. A telephone for reducing noise in a receive channel caused by a transmit channel, the telephone comprising:
a transceiver comprising:
a multiple-input-single-output (MISO) device, wherein the transceiver is configured to adjustably attenuate a transmit waveform, with a first filter at an output of the MISO device, at one or more frequencies within a receive band of frequencies associated with a receive frequency of the transceiver such that a noise floor requirement of the transceiver is satisfied at the receive frequency; and
a vector power amplification (VPA) transmitter that includes:
a plurality of vector modulators;
a plurality of second filters coupled; to corresponding outputs of the plurality of vector modulators; and
a plurality of drivers coupled to corresnonding outputs of the plurality of second filters; and
an antenna coupled to the transceiver and configured to transmit the transmit waveform.

16. The telephone of claim 15, wherein the first filter comprises:
a notch filter at the output of the MISO device configured to attenuate the transmit waveform at the receive frequency such that the noise floor requirement is satisfied at the receive frequency.

17. The telephone of claim 16, wherein the notch filter comprises:
a tunable center-frequency notch filter configured to attenuate the transmit waveform at the receive frequency such that the noise floor requirement is satisfied at the receive frequency.

18. The telephone of claim 15, wherein the first filter comprises:
a band-reject filter at the output of the MISO device configured to attenuate the transmit waveform at the receive frequency such that the noise floor requirement is satisfied at the receive frequency.

* * * * *

UNITED STATES PATENT AND TRADEMARK OFFICE
CERTIFICATE OF CORRECTION

Page 1 of 1

PATENT NO. : 9,106,316 B2
APPLICATION NO. : 12/473026
DATED : August 11, 2015
INVENTOR(S) : Sorrells et al.

It is certified that error appears in the above-identified patent and that said Letters Patent is hereby corrected as shown below:

Claims

In column 14, line 19, Claim 1, please replace "frequenci es" with --frequencies--.

In column 14, line 21, Claim 1, please replace "the, transceiver" with --the transceiver--.

In column 14, line 29, Claim 1, please replace "ofthe plurality" with --of the plurality--.

In column 14, line 53, Claim 2, please replace "the of least" with --the at least--.

In column 15, line 15, Claim 15, please replace "coupled; to" with --coupled to--.

In column 15, line 17, Claim 15, please replace "corresnonding" with --corresponding--.

Signed and Sealed this
Second Day of August, 2016

Michelle K. Lee
*Director of the United States Patent and Trademark Office*